United States Patent
Jaiswal et al.

(10) Patent No.: US 8,902,709 B2
(45) Date of Patent: Dec. 2, 2014

(54) METHODS FOR CONCURRENT GENERATION OF VELOCITY MODELS AND DEPTH IMAGES FROM SEISMIC DATA

(75) Inventors: Priyank Jaiswal, Houston, TX (US); Colin A. Zelt, Houston, TX (US)

(73) Assignee: William Marsh Rice University, Houston, TX (US)

( * ) Notice: Subject to any disclaimer, the term of this patent is extended or adjusted under 35 U.S.C. 154(b) by 1047 days.

(21) Appl. No.: 12/506,069

(22) Filed: Jul. 20, 2009

(65) Prior Publication Data

US 2010/0074053 A1  Mar. 25, 2010

Related U.S. Application Data

(60) Provisional application No. 61/135,333, filed on Jul. 18, 2008.

(51) Int. Cl.
*G01V 1/28* (2006.01)
*G01V 1/30* (2006.01)

(52) U.S. Cl.
CPC .............. *G01V 1/301* (2013.01); *G01V 1/303* (2013.01)
USPC .......................................................... 367/73

(58) Field of Classification Search
CPC ....... G01V 1/303; G01V 1/301; G01V 1/282; G01V 1/28; G01V 1/34; G01T 11/206; G03B 21/56; G09F 19/18; G06F 3/0346; G06F 3/002
USPC .......... 367/41, 46, 50, 53, 56, 75, 73; 702/14; 703/5
See application file for complete search history.

(56) References Cited

U.S. PATENT DOCUMENTS

| | | | |
|---|---|---|---|
| 4,736,347 A * | 4/1988 | Goldberg et al. | 367/46 |
| 4,766,574 A * | 8/1988 | Whitmore et al. | 367/50 |
| 5,251,184 A | 10/1993 | Hildebrand | |
| 6,424,464 B1 | 7/2002 | Neff | |
| 6,989,841 B2 | 1/2006 | Docherty | |
| 7,085,195 B2 | 8/2006 | Taner | |
| 7,609,585 B2 | 10/2009 | Jiao | |
| 2004/0199330 A1 * | 10/2004 | Routh et al. | 702/14 |

OTHER PUBLICATIONS

Jaiswal, et al., "Unified imaging of multichannel seismic data: Combining traveltime inversion and prestack depth migration", Geophysics, 73:2008, pp. VE269-VE280.
Zelt, et al., "Three-dimensional seismic refraction tomography: A comparison of two methods applied to data from the Faeroe Basin", J. Geophysical Res.-Solid Earth, 103:1998, pp. 7187-7210.

(Continued)

Primary Examiner — Daniel L Murphy
(74) Attorney, Agent, or Firm — Winstead PC

(57) ABSTRACT

In various embodiments, the present disclosure describes methods for processing seismic data to concurrently produce a velocity model and a depth image. Various embodiments of the methods include: a) acquiring seismic data; b) generating a shallow velocity model from the seismic data; c) generating a stacking velocity model using the shallow velocity model as a guide; d) generating an initial interval velocity model from the stacking velocity model; and e) generating an initial depth image using the initial interval velocity model. The methods also include iterative improvement of the initial depth image and the initial interval velocity model to produce improved depth images and improved interval velocity models. Improvement of the depth images and the interval velocity models is evaluated by using a congruency test.

20 Claims, 13 Drawing Sheets

(56) References Cited

OTHER PUBLICATIONS

Zelt, et al., "Three-dimensional structure across the Tintina strike-slip fault, northern Canadian Cordillera, from seismic refraction and reflection tomography", Geophysical J. Intern. 167:2006, pp. 1292-1308.

Jaiswal, et al., "2-D traveltime and waveform inversion for improved seismic imaging: Naga Thrust and Fold Belt, India", Geophysical J. Int., 173:2008, pp. 642-658.

Jaiswal, et al., "Seismic imaging of the Naga thrust using multiscale waveform inversion", Geophysics, 74:2009, pp. WCC129-WCC140.

* cited by examiner

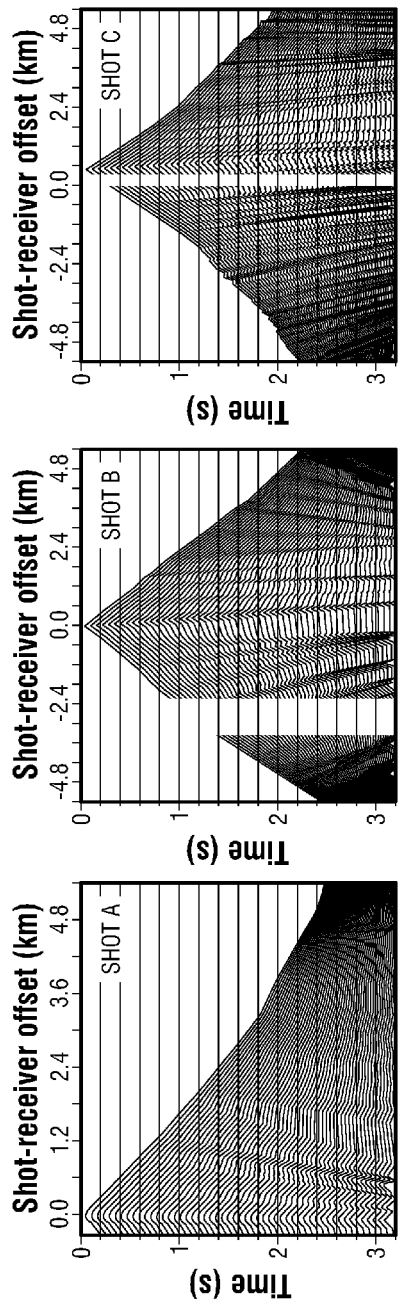

METHODS FOR CONCURRENT GENERATION OF VELOCITY MODELS AND DEPTH IMAGES FROM SEISMIC DATA

This application claims priority to U.S. provisional patent application 61/135,333 filed Jul. 18, 2008, which is incorporated by reference herein in its entirety.

STATEMENT REGARDING FEDERALLY SPONSORED RESEARCH

Not applicable.

BACKGROUND

Depth imaging of multichannel seismic data generally is viewed as a two-step process whereby an estimated velocity model that describes the large-wavelength characteristics of the subsurface is constructed and then used for depth migration studies to estimate small-wavelength subsurface features in the form of depth images. Such seismic imaging can therefore be considered to start with a velocity model and end with a geological model based on the most satisfactory interpretation of the depth images in view of the constraints imposed by estimated velocity model used. If the depth images are not satisfactorily interpretable, the velocity model can generally be modified to determine if a better depth image can be obtained. Thus, the geologic sensibility of the estimated velocity model and the correctness of the migrated depth image in view of the estimated velocity model define the limits of conventional geologic imaging processes.

Limited quality of migrated depth images can be attributed largely to either data or model-based reasons. Data-based reasons include, for example, the presence of statics, coherent noise such as ground roll, random noise, and ghost arrivals beyond the realm of the physics of migration. Model-based reasons include, for example, an inaccurate estimated velocity model that does not allow seismic energy waves to migrate to the correct spatial location. Velocity building models such as, for example, migration velocity analysis (MVA), have used data attributes including coherency and flatness of reflection events in the common-midpoint/common-image-point (CMP/CIP) domain as a function of velocity to validate the actual velocities themselves. In methods such as MVA, higher coherency and data flatness parameters imply more realistic velocities and goodness of fit to derived the geologic images.

An alternative to the above methods for velocity model building is traveltime inversion (TI), which objectively estimates the velocity models to reflect large-wavelength subsurface features. In TI methods, geological medium properties such as, for example, P-wave velocities, are estimated so that observed traveltimes can be simulated more closely by the derived velocity models. Although TI is typically conducted as a ray-based method, it can be conducted in both two- and three dimensions for interpretation of geologic data at different scales.

Velocity models obtained from TI can be particularly good estimates of the true velocity model for several reasons. First, TI honors the physics of wave propagation. Second, the data collected for TI (i.e., the arrival times of direct and reflected wave events) can be weighted according to the confidence with which they are identified in the data. Hence, noise effects can be reduced. Third, TI can be regularized such that large-scale geologic features are imaged first, followed by the smaller-scale features. Resolution of the estimated velocity models is determined by the inherent uncertainties present in the traveltime picking.

Given an appropriate velocity field (i.e., an estimated velocity model), depth migration studies estimate the spatial location of reflectors that create an observed wavefield. In other words, a depth image is generated based on an estimated velocity model. Depth migration may be formulated as a linearized inversion process. Attempts at merging depth migration and inversion include, for example, an operator-driven simultaneous prestack depth migration (PSDM) and velocity modeling approach. An alternative merged approach includes a migration-based traveltime formulation for automatically determining background velocities using local optimization methods. However, none of the approaches presented hereinabove are capable of concurrently generating both a velocity model and a depth image.

Geological imaging methods wherein a velocity model and a depth image are concurrently generated would offer considerable benefits in diverse endeavors such as, for example, subsurface exploration, environmental related imaging, understanding of geodynamic processes, and geotechnical applications for construction and hazard detection. The similar kinematic behavior of migration and inversion offers the opportunity to effectively couple these two features in concurrently producing velocity models and depth images. In the unified imaging methods disclosed herein, an iterative process is used to concurrently produce velocity models and depth images in generating a geologic image.

SUMMARY

In various embodiments, methods are disclosed herein for processing seismic data to concurrently produce a velocity model and a depth image.

In some embodiments, the methods include: a) acquiring the seismic data; b) generating a shallow velocity model from the seismic data; c) generating a stacking velocity model using the shallow velocity model as a guide; d) generating an initial interval velocity model from the stacking velocity model; and e) generating an initial depth image using the initial interval velocity model.

In other embodiments, the methods include: a) acquiring the seismic data; b) generating a shallow velocity model from the seismic data; c) stacking the seismic data; d) generating a stacking velocity model using the shallow velocity model as a guide; e) generating an initial interval velocity model from the stacking velocity model; f) generating an initial depth-migrated image using the initial interval velocity model; g) calculating initial inverted interfaces using the initial interval velocity model; and h) interpreting the initial depth-migrated image to compute initial interpreted interfaces.

In still other embodiments, the methods include: a) acquiring the seismic data; b) processing the seismic data to produce processed seismic data; c) generating a shallow velocity model from the processed seismic data; d) making static corrections to the processed seismic data using the shallow velocity model as a guide to produce static-corrected seismic data; e) generating a datum-corrected shallow velocity model from the static-corrected seismic data; f) generating a stacking velocity model using the datum-corrected shallow velocity model as a guide; g) stacking the static-corrected seismic data; h) generating an initial interval velocity model from the stacking velocity model; i) generating an initial depth-migrated image using the initial interval velocity model through prestack depth migration; j) calculating initial inverted interfaces using the initial interval velocity model; k) interpreting the initial depth-migrated image to compute initial interpreted interfaces; l) performing a first congruency test on the initial interpreted interfaces and the initial inverted interfaces; m) generating a first improved interval velocity model using the initial interpreted interfaces; n) generating a first improved depth-migrated image using the first improved interval velocity model; o) calculating first improved inverted interfaces using the first improved interval velocity model; p) interpreting the first improved depth-migrated image to compute first improved interpreted interfaces; q) performing a second congruency test on the first improved inverted interfaces and the first improved interpreted interfaces; and r) iterating steps m) through q). Processing includes improving signal-to-noise in the seismic data. Iterating includes 1) substituting the initial interpreted interfaces in step m) with the first improved interpreted interfaces to generate a second improved interval velocity model; 2) substituting the first improved interval velocity model in step n) with the second improved interval velocity model to generate a second improved depth-migrated image; 3) substituting the first improved interval velocity model in step o) with the second improved interval velocity model to calculate second improved inverted interfaces; 4) substituting the first improved depth-migrated image in step p) with the second improved depth-migrated image to interpret second improved interpreted interfaces; 5) substituting the first improved inverted interfaces in step q) with the second improved inverted interfaces; 6) substituting the first improved interpreted interfaces in step q) with the second improved interpreted interfaces; and 7) performing a third congruency test on the second improved inverted interfaces and the second improved interpreted interfaces in step q). Iterating is continued until there is a convergence of the second improved inverted interfaces and the second improved interpreted interfaces to a level of interpretational uncertainties present in the second improved depth-migrated image.

The foregoing has outlined rather broadly various features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIGS. 2A-2F present illustrative raw (FIGS. 2A, 2C and 2E) and processed (FIGS. 2B, 2D and 2F) seismic data;

DETAILED DESCRIPTION

Figure 1:
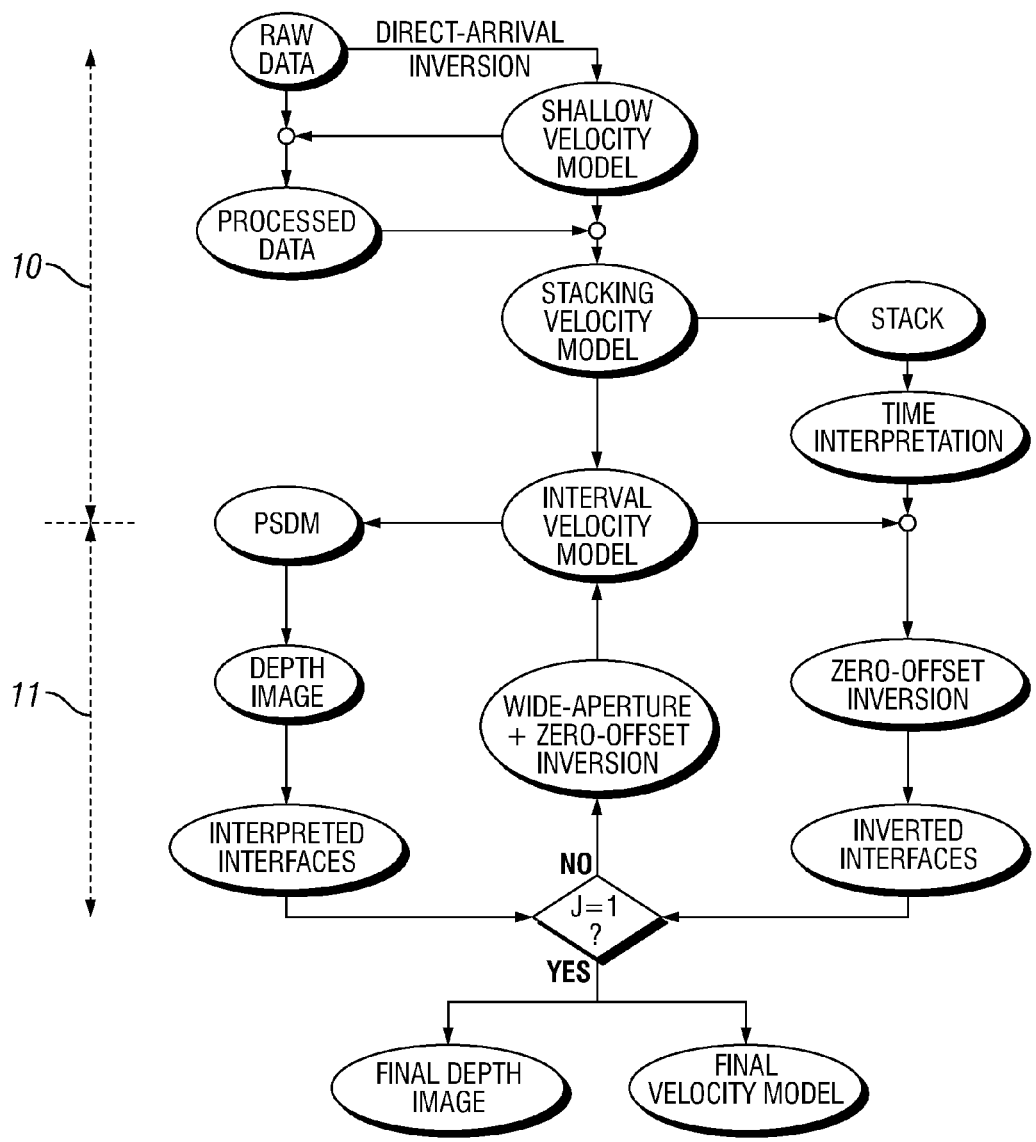
FIG. 1 presents an flowchart showing illustrative steps for processing of seismic data to concurrently generate a velocity model and a depth image.

In the following description, certain details are set forth such as specific quantities, concentrations, sizes, etc. so as to provide a thorough understanding of the various embodiments disclosed herein. However, it will be apparent to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Furthermore, drawings are not necessarily to scale.

While most of the terms used herein will be recognizable to those of ordinary skill in the art, it should be understood that when not explicitly defined, terms should be interpreted as adopting a meaning presently accepted by those of ordinary skill in the art. The following definitions are put forth to aid in understanding of the present disclosure.

"Common depth point (CDP) gathers," as used herein, refers to, for example, the point on a surface halfway between a source and a receiver that is shared by numerous source-receiver pairs in multichannel seismic data acquisition. Such redundancy among source-receiver pairs enhances the quality of seismic data when the seismic data are stacked.

"Datuming," as used herein, refers to, for example, an agreed and known value relative to which other measurements are corrected. In the various embodiments herein, datuming refers to, for example, an arbitrary planar surface to which corrections are made and on which sources and receivers are assumed to lie. Such datuming processes minimize the effects of topography and near-surface zones of low seismic wave velocity.

"Datum correction or datum-corrected," as used herein, refers to, for example, a value added to reflection times of seismic data. In various embodiments, datum correction is used to correct for the relative location of a source and a receiver in the seismic datum.

"Depth migration," as used herein, refers to, for example, a step in seismic data processing in which reflected seismic data are moved to their correct spatial locations using a velocity model. To ensure proper depth migration of reflected seismic waves, an accurate model of vertical and horizontal seismic velocity variations is utilized. "Pre-stack depth migration (PSDM)," as used herein, refers to, for example, a family of migration algorithms used to compute seismic wave travel times based on an established velocity field. The computed travel times can be used to produce a depth image of the subsurface. An illustrative migration algorithm is the Kirchhoff migration, for example.

"Ground roll," as used herein, refers to, for example, a type of coherent noise generated by a surface seismic wave, which is typically a low-velocity, low-frequency, high-amplitude Rayleigh wave. Ground roll can obscure signal and degrade overall seismic data quality Ground roll can be minimized through careful selection of source/receiver arrays, filters and stacking parameters.

"Interpretational uncertainty," as used herein, refers to, for example, events in seismic data that are beyond the physics of seismic models utilized.

"Interval velocity," as used herein, refers to, for example, the observed seismic wave velocity of a specific layer or layers of rock. Interval velocity is commonly calculated from acoustic logs or from the change in stacking velocity between seismic events on a common midpoint gather. In various non-limiting embodiments, the interval velocity refers to a P-wave velocity.

"Inversion," as used herein, refers to, for example, a mathematical process by which seismic data are used to generate a model that is consistent with the seismic data. "Inverted," as used herein, refers to, for example, the process of performing an inversion. In various embodiments, inverted seismic data is for pressure waves (P-waves). In various embodiments, the inverted seismic data is for shear waves (S-waves).

"Inverted interfaces," as used herein, refers to, for example, interfaces determined from inverted stacked data interpretation. In a depth image, the identified interfaces are in depth domain. In a stack, the identified interfaces are in time domain. The identified interfaces in time-domain in a stack are inverted to depth domain in a depth image. In the present disclosure, the terms interfaces and horizons will be understood to be synonymous.

"Normal moveout (NMO)," as used herein, refers to, for example, the effect of separation between a receiver and a source on the arrival time of a seismic reflection that does not dip. A seismic reflection typically arrives first at the receiver nearest the source. The additional offset between the source and other receivers induces a delay in the other reflection arrival times of a reflection from a substantially horizontal surface at depth.

"Stack," as used herein, refers to, for example, a processed seismic record containing seismic data that includes traces that have been added together from different records to reduce noise and improve overall data quality. "Stacking," as used herein refers to the process of generating a stack.

"Stacking velocity," as used herein, refers to, for example, the time-distance relationship determined from analysis of normal moveout (NMO) measurements from common depth point (CDP) gathers of seismic data. Stacking velocity is used to correct arrival times of events in seismic traces due to their varying offsets.

"Static correction," as used herein, refers to, for example, a bulk shift in time of a seismic trace during seismic processing. A common but non-limiting static correction used in the processing of seismic data is the weathering correction, which compensates for a layer of low seismic velocity material in the near subsurface. Static corrections also commonly compensate for topography differences and differences between source and receiver elevations.

"Traveltime," as used herein, refers to, for example, the duration in time required for the passage of a seismic signal from a source and back to a receiver. A time-seismic section typically shows two-way wave traveltimes.

In the various embodiments presented herein, methods utilized in standard TI and PSDM are implemented cyclically to iteratively generate a velocity model and a depth image. However, the geologic imaging methods disclosed herein are advantageous over application of the two protocols alone in that the velocity model and the depth image are concurrently created. Cyclical implementation of the two protocols allows continual refinement of the concurrently generated velocity models and depth images to be realized. Furthermore, the signal processing and data stacking methods of the present disclosure can be used to produce enhanced signal-to-noise in the seismic data. Such a unified imaging approach can be used to investigate a number of geologically complex areas including, but not limited to, areas where reflection events can deviate severely from hyperbolic approximations used in conventional geologic data processing. Such geologically complex areas include, for example, thrust belts.

In some embodiments, the seismic data for processing is newly collected seismic data acquired in the field. In other embodiments, the seismic data for processing is existing seismic data acquired from owners of the existing seismic data. In still other embodiments, the seismic data for processing is available to be acquired from a publicly accessible source.

In various embodiments, methods are described herein for processing seismic data to concurrently produce a velocity model and a depth image. In some embodiments, the methods include: a) acquiring the seismic data; b) generating a shallow velocity model from the seismic data; c) generating a stacking velocity model using the shallow velocity model as a guide; d) generating an initial interval velocity model from the stacking velocity model; and e) generating an initial depth image using the initial interval velocity model.

In some embodiments, the methods further include steps of: f) calculating initial inverted interfaces using the initial interval velocity model; g) interpreting the initial depth image to compute initial interpreted interfaces; and h) performing a first congruency test on the initial interpreted interfaces and the initial inverted interfaces. In still other embodiments, the methods further include steps of: i) generating a first improved interval velocity model using the initial interpreted interfaces; and j) generating a first improved depth image using the first improved interval velocity model.

In still other embodiments, the methods further include steps of: k) calculating first improved inverted interfaces using the first improved interval velocity model; l) interpreting the first improved depth image to compute first improved interpreted interfaces; m) performing a second congruency test on the first improved interpreted interfaces and the first improved inverted interfaces; and n) iterating steps i) through m). Iterating includes steps of: 1) substituting the initial interpreted interfaces in step i) with the first improved interpreted interfaces to generate a second improved interval velocity model; 2) substituting the first improved interval velocity model in step j) with the second improved interval velocity model to generate a second improved depth image; 3) substituting the first improved interval velocity model in step k) with the second improved interval velocity model to calculate second improved inverted interfaces; 4) substituting the first improved depth image in step l) with the second improved depth image to interpret second improved interpreted interfaces; and 5) substituting the first improved interpreted interfaces in step m) with the second improved interpreted interfaces and the first improved inverted interfaces in step m) with the second improved inverted interfaces and performing a third congruency test. In some embodiments, the iterating is continued until the second improved interpreted interfaces and the second improved inverted interfaces have converged to a level of interpretational uncertainties present in the second improved depth image. In some embodiments, each of the congruency tests include evaluating the coefficient of congruence, j. In some embodiments, iterating is continued until the coefficient of congruence is about 1. In some embodiments, iterating is continued until the coefficient of congruence is between about 0.9 and 1.1. In still other embodiments, iterating is continued until the coefficient of congruence is less than about 1.3.

In some embodiments, the methods further include generating a datum-corrected shallow velocity model from the shallow velocity model. In some embodiments, the methods further include performing a stacking analysis of the seismic data prior to generating the stacking velocity model. In some embodiments, the methods further include processing the seismic data to improve signal-to-noise. In some embodiments, the methods further include performing a stacking analysis of the seismic data after processing to improve signal-to-noise.

In some embodiments, each of the shallow velocity model, the initial interval velocity model, the first improved interval velocity model, and the second improved interval velocity model are generated through traveltime inversion. In various embodiments, the seismic data includes reflection arrival times, and the traveltime inversion includes inversion of the reflection arrival times.

In various embodiments, each of the initial depth image, the first improved depth image and the second improved depth image are generated through prestack depth migration (PSDM).

In some embodiments, processing the seismic data is conducted in two dimensions. In some other embodiments, processing the seismic data is conducted in three dimensions. In the non-limiting experimental example presented hereinbelow, data are processed in two dimensions. However, an extension of the data processing methods to three dimensions lies within the capabilities of one of ordinary skill in the art.

In various embodiments, the methods herein assume isotropic subsurface. In other various embodiments, the methods herein assume anisotropic subsurface. In some embodiments, the methods herein assume acoustic subsurface. In some or other embodiments, the methods herein assume a visco-elastic subsurface. One of ordinary skill in the art will also recognize that the non-limiting experimental example presented hereinbelow may be extended to an anisotropic subsurface, a viscoelastic subsurface, or a combination thereof using an extension of the methods described herein.

In other various embodiments, the methods include: a) acquiring the seismic data; b) generating a shallow velocity model from the seismic data; c) stacking the seismic data; d) generating a stacking velocity model using the shallow velocity model as a guide; e) generating an initial interval velocity model from the stacking velocity model; f) generating an initial depth-migrated image using the initial interval velocity model; g) calculating initial inverted interfaces using the initial interval velocity model; and h) interpreting the initial depth-migrated image to compute initial interpreted interfaces.

In some embodiments, the methods further include steps of: i) performing a first congruency test on the initial interpreted interfaces and the initial inverted interfaces; k) generating a first improved interval velocity model using the initial interpreted interfaces; l) generating a first improved depth-migrated image using the first improved interval velocity model; m) calculating first improved inverted interfaces using the first improved interval velocity model; and n) interpreting the first improved depth-migrated image to compute first improved interpreted interfaces.

In some embodiments, the methods further include steps of: o) performing a second congruency test on the first improved inverted interfaces and the first improved interpreted interfaces; p) generating a second improved interval velocity model using the first improved interpreted interfaces; q) generating a second improved depth-migrated image using the second improved interval velocity model; and r) iterating steps m) through q). In some embodiments, the iterating step includes: 1) substituting the first improved interval velocity model in step m) with the second improved interval velocity model to calculate second improved inverted interfaces; 2) substituting the first improved depth-migrated image in step n) with the second improved depth-migrated image to compute second improved interpreted interfaces; 3) substituting the first improved inverted interfaces in step o) with the second improved inverted interfaces; 4) substituting the first improved interpreted interfaces in step o) with the second improved interpreted interfaces; and 5) performing a third congruency test on the second improved inverted interfaces and the second improved interpreted interfaces in step o). Iterating is continued until the second improved interpreted interfaces and the second improved inverted interfaces have converged to a level of interpretational uncertainties present in the second improved depth-migrated image. In some embodiments, iterating is continued until the coefficient of congruence of the congruency test is about 1. In other embodiments, iterating is continued until the coefficient of congruence of the congruency test is between about 0.9 and 1.1. In still other various embodiments, iteration is continued until the coefficient of congruence is less than about 1.3.

In some embodiments of the methods, the methods further include processing the seismic data before generating the stacking velocity model. Processing includes improving signal-to-noise in the seismic data. In some embodiments of the methods, the step of generating an initial depth-migrated image is done using prestack depth migration.

In still other various embodiments, the methods include: a) acquiring the seismic data; b) processing the seismic data to produce processed seismic data; c) generating a shallow velocity model from the processed seismic data; d) making static corrections to the processed seismic data using the shallow velocity model as a guide to produce static-corrected seismic data; e) generating a datum-corrected shallow velocity model from the static-corrected seismic data; f) generating a stacking velocity model using the datum-corrected shallow velocity model as a guide; g) stacking the static-corrected seismic data; h) generating an initial interval velocity model from the stacking velocity model; i) generating an initial depth-migrated image using the initial interval velocity model through prestack depth migration; j) calculating initial inverted interfaces using the initial interval velocity model; k) interpreting the initial depth-migrated image to compute initial interpreted interfaces; l) performing a first congruency test on the initial interpreted interfaces and the initial inverted interfaces; m) generating a first improved interval velocity model using the initial interpreted interfaces; n) generating a first improved depth-migrated image using the first improved interval velocity model; o) calculating first improved inverted interfaces using the first improved interval velocity model; p) interpreting the first improved depth-migrated image to compute first improved interpreted interfaces; q) performing a second congruency test on the first improved inverted interfaces and the first improved interpreted interfaces; and r) iterating steps m) through q). Processing includes improving signal-to-noise in the seismic data. Iterating includes 1) substituting the initial interpreted interfaces in step m) with the first improved interpreted interfaces to generate a second improved interval velocity model; 2) substituting the first improved interval velocity model in step n) with the second improved interval velocity model to generate a second improved depth-migrated image; 3) substituting the first improved interval velocity model in step o) with the second improved interval velocity model to calculate second improved inverted interfaces; 4) substituting the first improved depth-migrated image in step p) with the second improved depth-migrated image to interpret second improved interpreted interfaces; 5) substituting the first improved inverted interfaces in step q) with the second improved inverted interfaces; 6) substituting the first improved interpreted interfaces in step q) with the second improved interpreted interfaces; and 7) performing a third congruency test on the second improved inverted interfaces and the second improved interpreted interfaces in step q). Iterating is continued until there is a convergence of the second improved inverted interfaces and the second improved interpreted interfaces to a level of interpretational uncertainties present in the second improved depth-migrated image. In some embodiments, iterating is continued until the coefficient of congruence of the congruency test is about 1. In other embodiments, iterating is continued until the coefficient of congruence of the congruency test is between about 0.9 and 1.1. In still other embodiments, iterating is continued until the coefficient of congruence is less than about 1.3.

In the most general sense, the embodiments of the methods described in the present disclosure are implemented in two stages. FIG. 1 presents a flowchart showing illustrative steps used in the processing of seismic data to concurrently generate a velocity model and a depth image. The first stage 10 estimates a preliminary velocity model by TI, which is subsequently improved in the second stage 11 using PSDM, for example. For example, the preliminary velocity model of the first stage is initially constructed as a shallow velocity model which is subsequently transformed into a stacking velocity model. In various embodiments, horizon geometry is also estimated by the preliminary velocity model of the first stage.

For the second stage of the methods disclosed herein, the stacking velocity model of the first stage is subsequently transformed into an initial interval velocity model. An initial depth image and a finalized depth image are generated in the second stage of the methods described herein, while an improved interval velocity model is iteratively generated utilizing the depth images and interpreted interfaces. In various embodiments, the depth images are generated using PSDM. The improved interval velocity model is subsequently used to iteratively improve the depth image until convergence of interpreted and inverted interfaces occurs, which is consistent with the noise level present in the seismic data.

TI is a model-based method for estimating subsurface velocities and horizon geometry by simultaneously inverting direct and reflection arrival times of sound waves penetrating a geologic structure. The direct and reflection arrival times of the sound waves that are used for generation of the velocity model and processing of the horizon geometry are picked using pre-stack data. In contrast, reflection arrivals that are used for determination of horizons only are picked using post-stacked data. In all of its various embodiments, TI is performed in the shot domain.

PSDM maps energy from time to space. Seismic data is typically acquired in a time domain (i.e., a wave arrival time), and the depth image generated by PSDM represents a space domain (i.e., a location). As generally practiced, PSDM utilizes an estimated velocity model in order to generate a depth image. If the estimated velocity model happens to be the true subsurface velocity model, the seismic energy will be migrated to its correct spatial location in generating the depth image. In contrast, if the estimated velocity model is incorrect, the seismic energy will not be migrated to its proper spatial location. In embodiments of the present disclosure utilizing PSDM modeling methods, a Kirchoff PSDM routine was utilized. However, one of ordinary skill in the art will recognize that other PSDM data processing routines can be used, and the embodiments of the present disclosure should not be taken as limiting. For example, PSDM routines such as Reverse Time Migration may also be used.

The first stage of the methods disclosed herein is similar to conventional velocity model building. In various embodiments, however, the preliminary velocity model of the first stage is weighted toward the inversion of the first-arrival reflected waves and hence represents a shallow velocity model. The deepest stratigraphy is not imaged by the first-arrival reflected waves and is not generally included in the shallow velocity model of the first stage.

In addition to providing preliminary geologic insight into the subsurface structure, the initial shallow velocity model aids in making static corrections and datuming in various embodiments of the present disclosure. In various embodiments of the present disclosure, the initial shallow velocity model can be improved by datuming. The improved shallow velocity model can then guide stacking of the velocity picks to generate a stacking velocity model. In various embodiments, datuming is accomplished by a prestack wave-equation method, wherein 1) static corrections are applied; 2) data are processed to enhance signal-to-noise (S/N); and 3) data are then sorted into the CMP domain and used for a stacking velocity analysis to the deepest stratigraphy of interest.

In various embodiments, the stacking velocity model obtained in the first stage is used for stacking of the seismic data and is further transformed into an initial interval velocity model. The initial interval velocity model is subsequently used to initiate the second stage of the presently disclosed methods for depth migration studies using PSDM to generate an initial depth image. In various embodiments, the Kirchoff prestack method is used for the depth migration studies.

In various embodiments, the initial depth image and the stacked data are interpreted for common horizons based on their reflection characteristics and geologic significance. Wide-aperture traveltimes (to maximum available offsets) corresponding to the interpreted horizons are identified in the shot records. In the various embodiments of the present disclosure, any number of horizons can be interpreted from processed seismic data. In the Experimental Example that follows, seismic data that contains three interpreted horizons is presented. Besides their geologic significance, the interpreted horizons also are chosen for their reflection strength and continuity.

In various embodiments of the present disclosure, the initial interval velocity model applied in the second stage of the present methods is evaluated to determine if further refinement is needed. The determination of whether a given interval velocity model requires any improvement is assessed first through a congruency test. The congruency test is based on the fact that an interpreted horizon in the stacked data is the zero-offset response of the same horizon interpreted in the depth image referenced hereinabove.

If an interpreted horizon in the stacked data is inverted, while keeping the interval velocity model stationary, and if the evaluated velocity model is the true velocity model, individual time picks of the inverted horizons will be recovered at their actual spatial locations. In addition, depth migration analysis will transport energy to the proper spatial location if the migration is performed using the true velocity model. Therefore, when the true velocity model is used, the image yielded by both zero-offset inversion and depth migration will be close to the true image of the subsurface stratigraphy. Although the evaluated depth image is a reflectivity image displaying all interfaces that have sufficient impedance contrast to perturb the propagating finite-frequency wavefield, the zero-offset inverted model will contain only those interfaces that have been interpreted in the stacked data.

Bearing the above features in mind, the congruency test may be conducted as follows. The proximity of a given velocity model to the true velocity model can be assessed by measuring the rms distance, d, between the interfaces from the inversion of zero-offset reflections and the corresponding interfaces from interpretation of the depth image using Formula (1).

$$d = \frac{1}{n}\sqrt{\sum_{i=1}^{n}(z_i^p - z_i^v)^2}. \quad (1)$$

In formula (1), $z^p$ and $z^v$ are the interpreted and inverted interfaces, respectively, n is the number of nodes at which the interfaces are compared, and i represents the ith node. Because of the limited frequency bandwidth of the depth image and the presence of random and coherent noise, the interpreted horizons in the depth image are typically associated with uncertainties. To account for the uncertainties, a coefficient of congruence, j, is then defined by Formula (2) to more accurately measure the proximity of a given velocity model to the true velocity model.

$$j = \frac{1}{n}\sqrt{\sum_{i=1}^{n}\left(\frac{z_i^p - z_i^v}{\sigma_i}\right)^2}. \quad (2)$$

In Formula (2), $\sigma_i$ is the uncertainty assigned at the ith node, and the remaining symbols have their meaning given above for Formula 1. A value of unity for j implies that the structural discrepancies have been fitted to the level of the interpretational uncertainties, and the velocity model being evaluated is said to have converged. Similarly, a value of j greater than unity implies that the velocity model still needs improvement, and a value of j less than unity suggests that the data have been overfitted.

In various embodiments of the present disclosure, the second stage of the methods for processing seismic data include iterative improvement of the initial interval velocity model and the depth image so that these elements move progressively toward their true values. Such evaluation is conducted in embodiments of the present disclosure using the congruency test referenced hereinabove. In various embodiments, the updates to the interval velocity model and the depth image are computed from a joint inversion of the direct arrival waves and the reflection (zero-offset and wide-aperture) traveltimes. This process is repeated iteratively until the velocity model converges.

The second stage of the disclosed methods begins with iterative input of the initial interval velocity model and horizons that were computed in the first stage. Further iterative processing of these initial values takes place in the second stage to improve the interval velocity model and the depth image. For example, the depth image from a previous cycle is used to generate an improved interval velocity model, and the improved interval velocity model in turn is used to generate an improved depth image. Such iterative processing is continued until the interval velocity model converges to a desired degree.

In various embodiments of the disclosed methods, horizons are modeled as floating reflectors. Following the first iterative step, the improved interval velocity model is used for depth migration and zero-offset inversion. For the zero-offset inversion, the velocity model is maintained stationary. The depth image so obtained is then interpreted using the same horizons as were computed in the first stage. The interpreted horizons are compared with the corresponding inverted horizons by computing j to test for congruency. If j substantially exceeds unity, the improved interval velocity model and the interpreted depth images of the current cycle are used as the initial input for the velocity model and horizon depths for the next iterative cycle. Iterative processing is repeated in a similar manner until a value of substantially unity is reached for j. Although any number of iterative cycles may be needed for j to converge to unity, a typical number of iterative cycles is usually about 3. For example, the number of cycles needed for convergence of j to unity is about 1 to about 100 in some embodiments of the present disclosure, about 1 to about 10 in other embodiments, and from about 1 to about 3 in still other embodiments.

In various embodiments, the methods herein utilize two TI methods using three data sets. In the first stage, only the first-arrival reflected waves are inverted. Hence, they constrain the shallow velocity model using the regularized Zelt and Barton method (see C. A. Zelt and P. J. Barton, "Three-dimensional seismic refraction tomography: A comparison of two methods applied to data from the Faeroe Basin," J. Geophysical Res.-Solid Earth, 1998:103, pp. 7187-7210, incorporated by reference). In the second stage, zero-offset reflections are inverted to constrain interfaces, and the first-arrival reflected waves are inverted jointly with the zero-offset and wide-aperture reflections to constrain the velocities and interfaces simultaneously by using methods described by Zelt et al. (see C. A. Zelt, R. M. Ellis, and B. C. Zelt, "Three-dimensional structure across the Tintina strike-slip fault, northern Canadian Cordillera, from seismic refraction and reflection tomography," Geophysical J. Intern., 2006:167, pp. 1292-1308, incorporated by reference).

In various embodiments of the methods of the present disclosure, traveltimes in the two TI methods are computed on a regular grid by solving the eikonal equation using a finite-difference scheme, which has been modified to account for large velocity gradients. In various other embodiments, finite elements and finite volume can also be used to solve the eikonal equation, and the embodiments of the present disclosure should not be considered as limiting. Ray paths, in accordance with Fermat's principle, are determined by following the steepest gradient of the time field from a receiver to a source. The inverse modeling part in the two TI methods linearizes the nonlinear traveltime inverse problem with an initial model that is updated iteratively, based on the inherent discrepancy between observed and predicted traveltimes.

In other various embodiments of the present disclosure, a wave equation can be solved instead of the eikonal equation to obtain a minimum-time path between a source-receiver pair (i.e., the ray path). Advantages of using a wave equation instead of the eikonal equation include providing the capability to address the attenuative, inelastic and anisotropic nature of the subsurface in both 3-D and 2-D.

Inverse modeling formulates an objective function, which is the $L_2$-norm of a combination of data errors and model roughness (second-order partial derivative) and minimizes it to compute the model updates in the second stage. For a given observed data vector $d_{obs}$ and predicted data vector $d_{pre}$, the objective function for constraining the velocities only is given by Formula (3).

$$E(s) = \delta d^T C_d^{-1} \delta d + \lambda [\delta s^T C_{s,h}^{-1} \delta s + s_z \delta s^T C_{s,v}^{-1} \delta s]. \quad (3)$$

Likewise, the objective function for constraining the interfaces only is given by Formula (4).

$$E(z) = \delta d^T C_d^{-1} \delta d + \lambda [\delta z^T C_{z,h}^{-1} \delta z]. \quad (4)$$

The objective function for simultaneously constraining the velocities and the interfaces is conveniently expressed using Formula (5).

$$E(s,z) = \delta d^T C_d^{-1} \delta d + \lambda \{\beta [\delta s^T C_{s,h}^{-1} \delta s + s_z \delta s^T C_{z,v}^{-1} \delta s] + (1-\beta)[\delta z^T C_{z,h}^{-1} \delta z]\}. \quad (5)$$

In Formulas (3)-(5), $\delta d = d_{pre} - d_{obs}$ are the data errors and $\delta s = s - s_0$ is the slowness perturbation vector that is being solved for. Further in Formulas (3)-(5), $s_0$ is the starting slowness vector; $C_d$ is the data covariance matrix; and covariance matrices $C_{s,h}$ and $C_{s,v}$ measure horizontal and vertical roughness of the slowness perturbation, respectively. In Formulas (4) and (5), $\delta z = z_0 - z$ is the interface depth perturbation vector being solved for, $z_0$ is the starting interface vector, and $C_{z,h}$ is the covariance matrix that measure the interface roughness. In Formula (5), $\beta$ determines the relative weights of slowness and interface regularizations.

Regularization in Formulas (3)-(5) is implemented by scaling with the inverses of the data and the model (slowness and interface) space co-variance matrices to obtain the smoothest model appropriate for the data errors. In various embodiments, the data misfit in traveltime inversion is assessed using the normalized form of the misfit parameter [i.e., the chi-squared ($\chi^2$) error]. Assuming that the errors in the observed picks are uncorrelated and Gaussian in nature, a $\chi^2$ value of one indicates that the observed traveltimes have been fitted to within their assigned uncertainties.

The cyclic approach utilized in the second stage of the methods disclosed herein attempts to mitigate nonuniqueness resulting from the limited angular coverage typically seen in seismic data. For example, reflecting rays have a narrower aperture than first-arrival rays, so the velocity-depth trade-off in the parts of the model not covered by first arrivals can be large. For a single depth node influenced by a reflecting ray, depending on the depth of the reflecting interface, a significantly higher number of velocity nodes can be influenced. As a result, the overall updates of the velocities are more than that of the corresponding interface depths. In addition, reflection traveltimes from different interfaces and the first arrivals vary in count. Therefore, to ensure that all parts of the model are updated appropriately in any given cycle, the free parameters in Formulas (3)-(5) [i.e., $\lambda$, $\beta$, and $s_z$] are generally chosen for optimal fit, which may entail several runs of the joint inversion process with different combinations of these free parameters.

Advantageous flattening of reflection events in common reflection/image/mid-point domain is observed to be an automatic byproduct of the improved traveltime fit protocols described herein. Another distinct advantage is that the traveltime inversion is applied in the shot domain (i.e., the domain in which the data acquisition actually takes place in the field). As a result of shot domain application, the physics of the actual wave propagation in real earth is most closely honored in the computer modeling.

Because of the inherent velocity-depth trade-off in the joint inversion, achieving a $\chi^2$ value of unity in every cycle is not necessarily an ultimate goal. Instead, the overall geologic sensibility of the updated interval velocity model and depth image at each iteration is given more emphasis. For example, the joint inversion process is halted when the updated interval velocity model starts to yield structures that appear to be geologically implausible, even if convergence has not yet been reached. For given updates in the interval velocity model, updates in the corresponding interface depths in the form of an updated depth image are sought through PSDM. As the iterated interval velocity model becomes closer to the true velocity model, the migrated depth image also positions the interfaces closer to their true depth locations.

In various embodiments, the methods disclosed herein may be used to assay a land-based geologic structure. In other various embodiments, the methods disclosed herein may be used to assay a marine-based geologic structure. Although the embodiments herein are presented with land-based data, the basic workflow involved remains essentially the same for marine-based data. For marine-based data, direct arrival waves may not be inverted. Hence, for marine-based data the TI may only include inversion of reflection traveltimes. For marine-based data, while the first arrivals will be inverted jointly with the reflection arrivals as in land-based processing, the TI may also be performed in receiver domain depending on the receiver separation.

Possible uses of the modeling methods described herein include, for example, hydrocarbon, mineral and groundwater exploration; environmental related imaging (i.e., detecting subsurface waste deposits and monitoring carbon sequestration, for example); understanding of geodynamic processes; and geotechnical applications for construction and hazard-detection applications. The methods disclosed herein can also be used in conjunction with other disciplines such as, for example, petrophysics and geochemistry, to study climate change.

EXPERIMENTAL EXAMPLES

The following experimental examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Study Area: The 2D seismic data analyzed in this study came from the Naga Thrust and Fold Belt (NTFB) in India. The NTFB has been a prolific producer of hydrocarbons since the end of the 1800s. During the last 30 years, improved geoscience technologies have located most of the large hydrocarbon plays in the foreland. Current exploration trends have aimed at targets in the footwall that lie in the shadow of the Naga thrust fault. Although such subthrust targets are thought to hold great promise, drilling results have generally shown otherwise. Limited drilling successes for subthrust targets have been largely attributed to the lack of a reliable seismic image.

Seismic Acquisition and Data: The seismic data were acquired in the central part of the NTFB perpendicular to the trend of the Naga thrust fault where the outcropping hanging wall culminates topographically. The variation in topography along the seismic line is about 70 m. The data were acquired in a split-spread acquisition style with a receiver spacing of 30 m and a nominal fold of 60. The seismic line was approximately 22 km long and included 276 shots using class 2 explosive sources placed in boreholes of about 30 m in depth. The shot spacing was 30-90 m, with a minimum offset of 0-30 m and a maximum offset of 5.25-5.43 km. The data were recorded with a 2-ms sampling interval. Overall, the data had a moderate S/N and a broad frequency bandwidth of 8-80 Hz. The background noise had a power about 30 dB lower than the signal.

Based on variations in data quality, the seismic line was divided into three parts. Approximately 6 km along the central part of the seismic line is the fault-trace region (FTR). Northwest and southeast of the FTR, respectively, are the foreland region (FR) and the thrust-belt region (TBR). FIGS. 2A-2F show illustrative raw and processed seismic data from the FR (FIGS. 2A and 2B), FTR (FIGS. 2C and 2D), and TBR (FIGS. 2E and 2F). In general, the raw data were contaminated with a low-frequency, high-amplitude ground roll (FIGS. 2A, 2C and 2E). Static correction (i.e., processed data) in FIGS. 2B, 2D and 2F increased the overall signal-to-noise ratio. In the static-corrected data, reflection picks were indicated according to their respective phases used in the inversion process. Data from the FR had the highest S/N (FIG. 2A). The S/N of the data from the FTR and TBR deteriorated rapidly with offset (FIGS. 2C and 2E). FIGS. 2A-2F also show the inconsistency of energy penetration along the seismic line, as indicated by varying shot-to-shot S/N and ground-roll envelope. Additionally, data from the FTR were contaminated with reverberations (FIG. 2C), possibly from a combination of poor receiver coupling and energy trapped by the hanging wall of the Naga thrust. In general, any data recorded from malfunctioning receivers were discarded for processing and inversion.

Figure 3A:
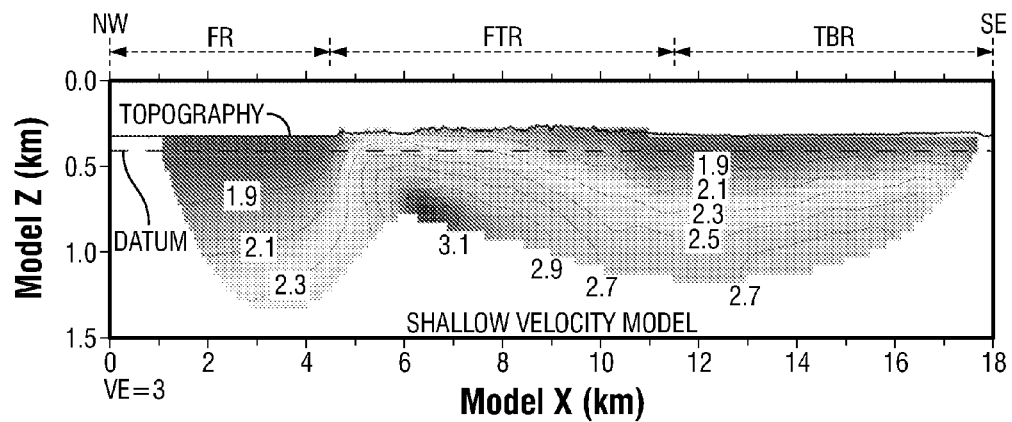
FIGS. 3A and 3B present an illustrative initial shallow velocity model (FIG. 3A) and datum-corrected shallow velocity model (FIG. 3B) utilized in the methods disclosed herein.

First Stage of Modeling Methods:

Shallow velocity model: The first stage of disclosed modeling methods began by inverting the first arrival waves to estimate an initial shallow velocity model, which is shown in FIG. 3A. About 21,000 first-arrival times were used from 91 shots spaced apart about every 250 m along the line. The starting model for first-arrival inversion was constructed by averaging regional drilling results in the foreland of the Naga thrust belt. The generated model was laterally homogeneous with a linearly increasing velocity function (1.5 km/s at the surface to 3.0 km/s at 2.5 km depth). Uncertainties of 8-60 ms were assigned to the first-arrival times, based on the dominant frequency and ambient noise. The initial shallow velocity model of the present embodiment evolved from the initial input conditions and converged with a normalized $\chi^2$ close to unity in nine iterations.

After estimation of the initial shallow velocity model, data processing to enhance the S/N was also included in the first stage of the modeling methods. The first step in the data processing sequence involved trace editing to remove any noisy traces. As a result of the data processing step, 10%, 30%, and 15% noise reduction was achieved in the data from the FR, FTR, and TBR, respectively. The particularly high noise reduction in the FTR was attributed to a large number of poorly coupled and inactive receivers in that region. After data processing, an 8-12.5-60-80-Hz minimum-phase Ormsby filter was applied to the edited traces. In the FTR, predictive deconvolution suppressed the reverberations. In the FR and TBR, however, predictive deconvolution was not particularly beneficial.

Figure 3B:
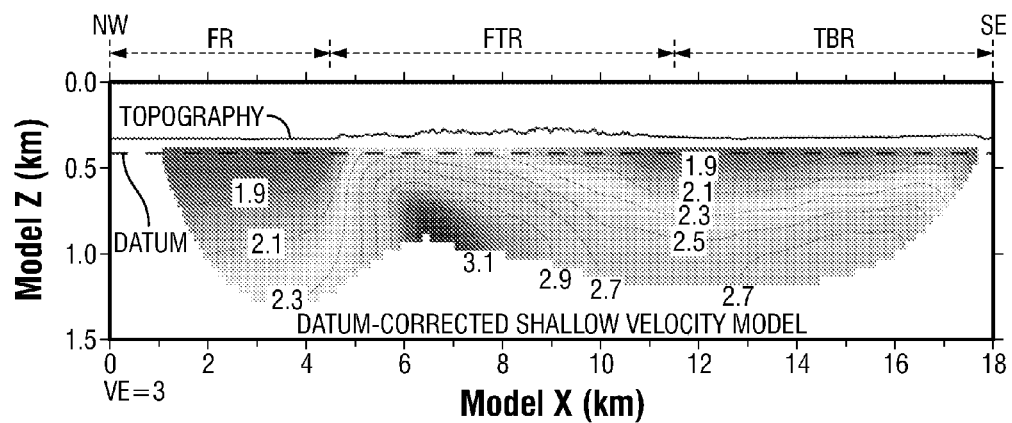

Static corrections for the processed data were calculated using prestack wave-equation datuming using the initial shallow velocity model. The datum in the study area was 91.44 m, and the minimum and maximum elevations along the seismic line were 123 m and 194 m above mean sea level, respectively. To ensure that static correction did not introduce artifacts in the model, the first arrival waves in the static-corrected data were picked and inverted. The initial velocity model and data uncertainties remained the same as their counterparts used in estimating the initial shallow velocity model. The datum-corrected shallow velocity model, which is shown in FIG. 3B, converged with a $\chi^2$ close to unity in five iterations. Comparing FIGS. 3A and 3B, it appeared that the static corrections were reasonable based on the similarity of the velocity models obtained. A final step in the data processing sequence was attenuating ground roll using frequency-wavenumber deconvolution of the static-corrected data.

Figure 4:
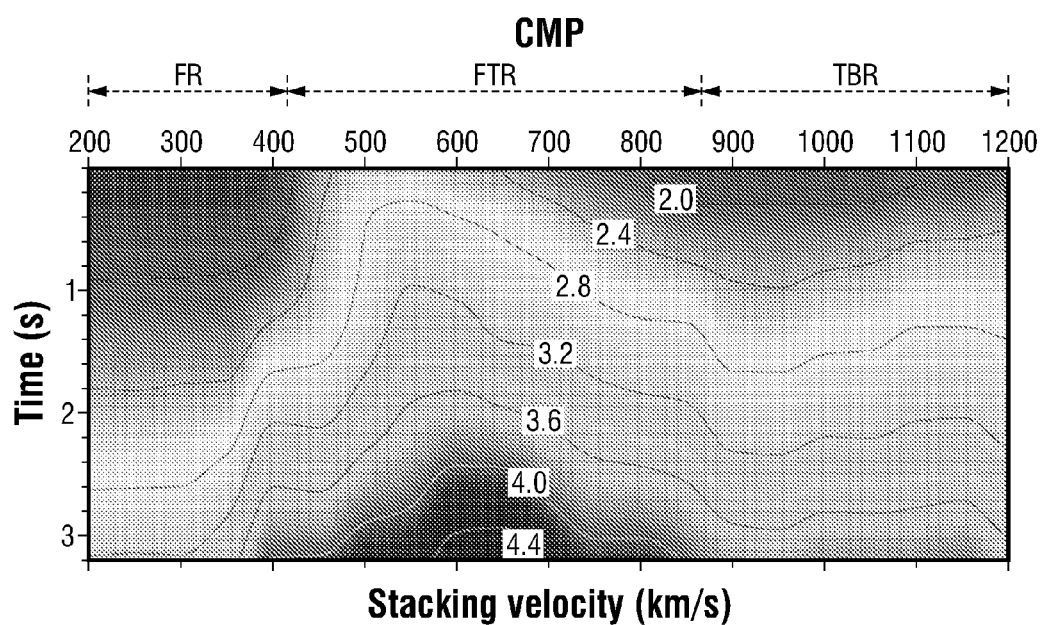
FIG. 4 presents an illustrative stacking velocity model utilized in the methods disclosed herein.

Continuing in the first stage of the modeling methods, the datum-corrected processed data were used for a stacking velocity analysis to build a stacking velocity model with minimum structure and lateral smoothness. The stacking velocity model is shown in FIG. 4. As used herein, minimum structure refers to a condition in which the stacking velocity model contains only those features required by, not merely consistent with, the reflection events to be stacked. The smoothness of the stacking velocity model is exploited subsequently in steps presented hereinbelow. The semblance method was used to pick the stacking velocities.

Stacking velocity analysis was performed iteratively. Velocity picking in each iteration was guided by the datum-corrected shallow velocity model transformed to stacking velocities. Stacking velocity analysis was performed at every twenty-fifth common depth point (CDP) (~375 m intervals). Each iteration involved velocity picking followed by normal moveout (NMO) and dip-moveout (DMO) corrections. Subsequently, inverse NMO corrections and repicking of the velocities was performed. Velocity picking was conducted iteratively until two subsequent stacking velocity models were found to have minimal difference. The final stacking velocity model was obtained after three iterations. At that stage, the data were stacked after NMO and DMO corrections.

Figure 5A:
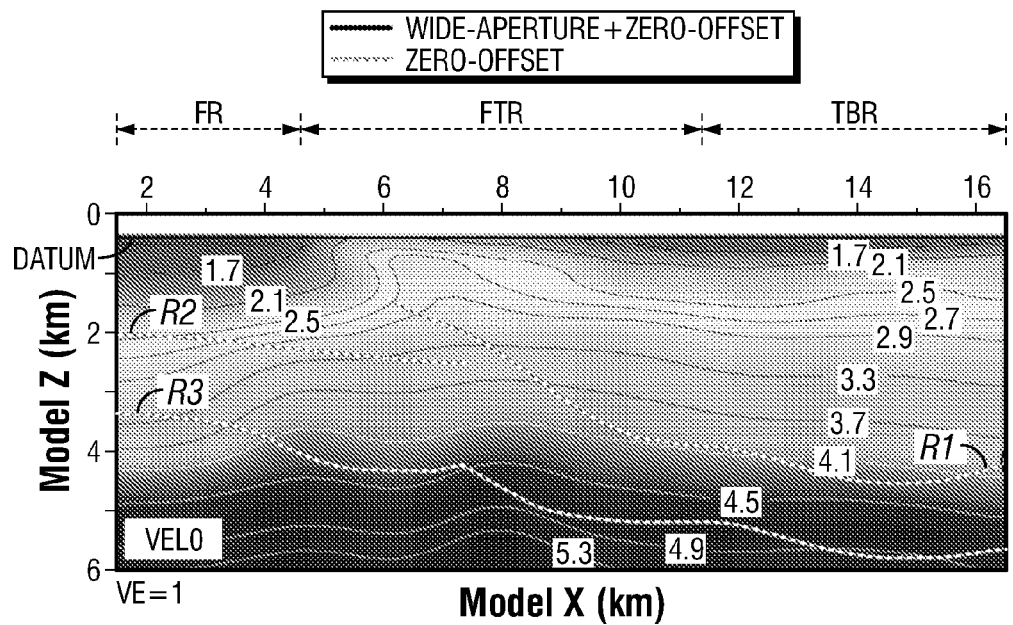
FIGS. 5A-5D present an illustrative initial interval velocity model (FIG. 5A) and progressive iterative updates to the interval velocity model (FIGS. 5B-5D) generated by the methods disclosed herein.
Figure 6A:
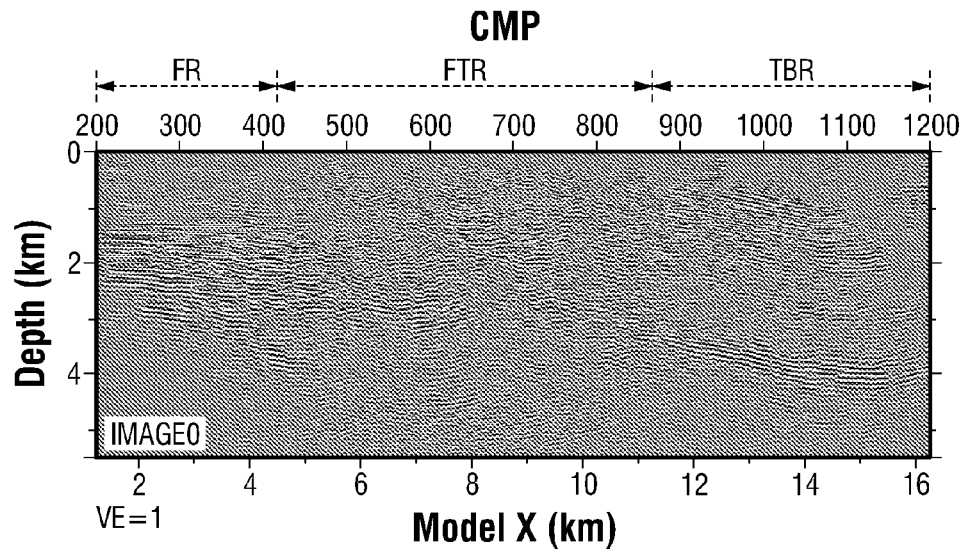
FIGS. 6A-6D present an illustrative initial depth image (FIG. 6A) and progressive iterative updates to the depth image (FIGS. 6B-6D) generated by the methods disclosed herein.

Second Stage of Modeling Methods:

Initial PSDM and Image Generation: The stacking velocity model shown in FIG. 4 was converted to an initial interval velocity model that is shown in FIG. 5A. The initial interval velocity model was subsequently used for iterative PSDM. Because PSDM is performed in a common-offset domain, the data that initially were sorted into the shot domain for processing and datuming were first binned according to their shot-receiver offset. The resulting common-offset bins were padded to ensure that each bin had at least one trace per receiver station. The migration aperture was set to about 6 km, and a maximum frequency of 60 Hz was migrated. The resulting geologic image of the initial PSDM analysis is shown in FIG. 6A and is considered to be an initial depth image of the subsurface.

Based on reflection characteristics, the stacked data and the initial depth image were interpreted for common horizons. In the present embodiment, three interpreted horizons (R1, R2, and R3, for example) were identified based on their reflection strength and continuity as well as their overall geologic sensibility. Although three horizons were identified in the present example, one of ordinary skill in the art will recognize that geologic structures may contain any number of horizons, and the methods of the present disclosure may be used to interpret any number of potential horizons. In the stacked data of the present example, 367, 210, and 590 reflection picks were made for interpreting R1, R2, and R3, respectively. These picks are considered to be zero-offset reflections. Based on the dominant frequency and the random noise of the data, uncertainties of 6-20 ms and 10-30 m were assigned to the time and depth interpretations, respectively, of horizons R1, R2, and R3.

Figure 7A:
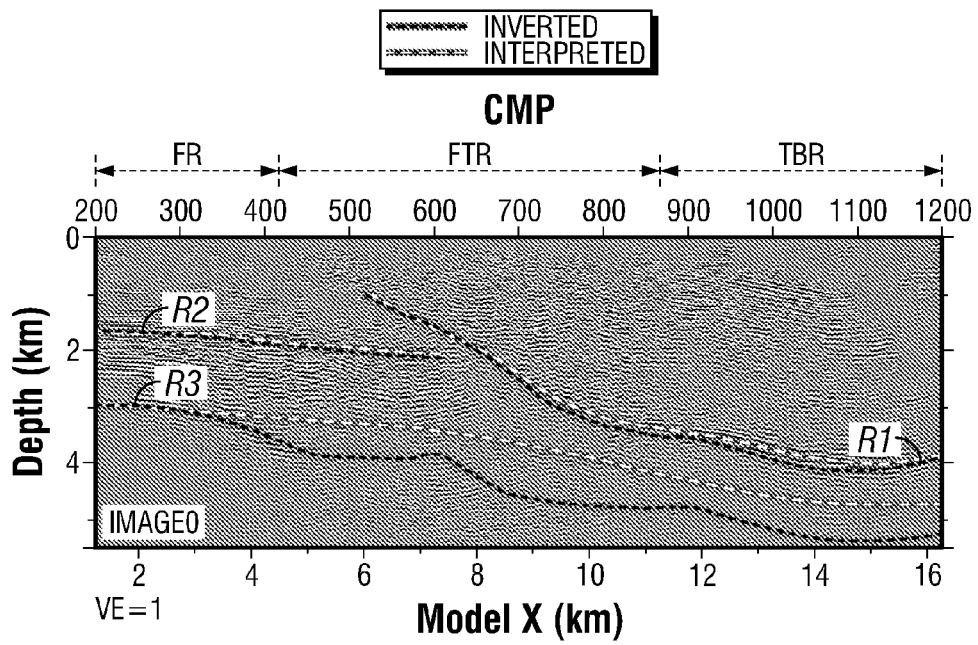
FIGS. 7A-7D present an illustrative initial depth image showing inverted and interpreted horizons (FIG. 7A) and progressive iterative updates to the depth image and horizons (FIGS. 7B-7D)

Congruency Test: The zero-offset reflections corresponding to R1, R2, and R3 were inverted to constrain their respective interfaces in depth. The initial interval velocity model transformed from the stacking velocity model was used for this step and was maintained stationary for the zero-offset inversion. The initial interfaces for the zero-offset inversion were obtained by time-to-depth scaling of the zero-offset picks using the initial interval velocity model. The j values for the initial interval velocity model for R1, R2, and R3 were 16.80, 8.23, and 38.61, respectively. The significant deviations of j from unity confirmed that further refinements of the interval velocity model would be beneficial. FIG. 7A presents the initial depth image showing the inverted and interpreted horizons R1, R2 and R3. As shown in FIG. 7A, the inconsistency between the inverted and interpreted horizons also indicated that further refinement of the initial interval velocity model would be beneficial, particularly in the FTR and TBR.

Using the inverted interfaces and the initial interval velocity model, wide-aperture traveltimes were simulated, honoring the acquisition geometry for the same 91 shots that were used for picking the first-arrival waves. Shots were generally chosen for consistency and ease of modeling. The simulated traveltimes were used as a guide in picking the reflection arrivals in the shot records. For shots located in the FR, wide-aperture reflections were picked to be the farthest offsets in the data. In the FTR and the TBR, because of noise and waveform merger, wide-aperture picking was typically restricted to about a 3.5-km offset. In the present example, 2333, 1763, and 4118 wide-aperture picks were made for R1, R2, and R3, respectively. Uncertainties of 6-20, 6-10, and 10-40 ms were respectively assigned to R1, R2, and R3 wide-aperture picks based on the dominant frequency and ambient noise. The wide-aperture and zero-offset reflections with the first arrival waves form the data set for joint inversion described hereinbelow.

Figure 5B:
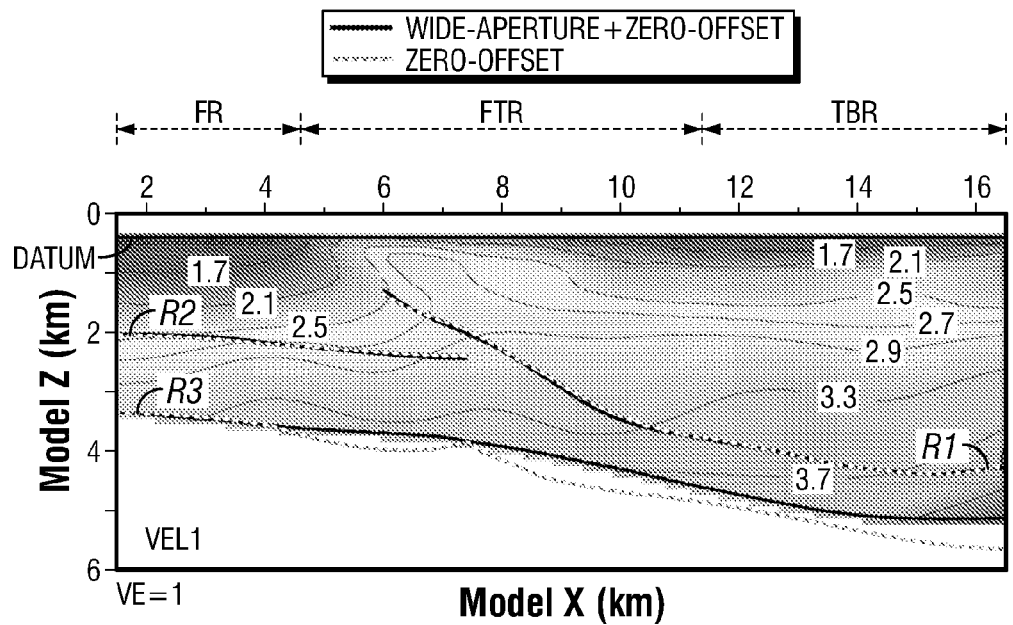
Figure 5C:
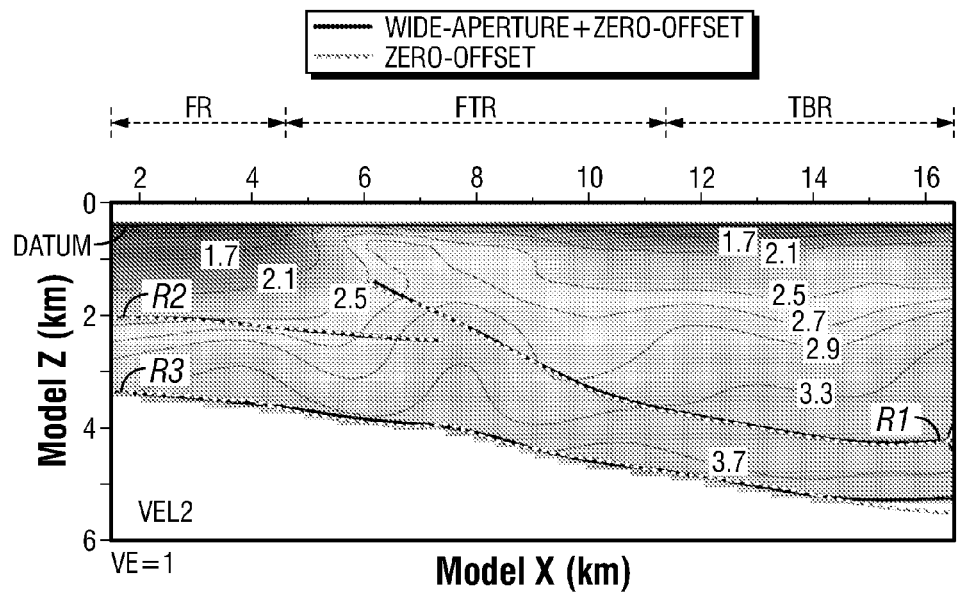

Iterative Update of the Interval Velocity Model and Depth Image: The latter steps of the modeling methods described herein progressively update the interval velocity model (see FIGS. 5B-5D for progressive iterative updates of the interval velocity model) and the corresponding depth image (see FIGS. 6B-6D for progressive iterative updates of the depth images). FIGS. 7B-7D show progressive iterative updates of the depth image and the corresponding iterative changes produced in the interpreted and inverted horizons R1, R2 and R3. In the present example, three iterative cycles were used until the discrepancies between the inverted and interpreted R1, R2, and R3 horizons were reduced to within interpretational uncertainties. RMS errors for horizons R1, R2 and R3 are shown in Table 1 for each iterative cycle.

TABLE 1

Iterative RMS Errors in Horizons R1, R2 and R3

| Horizon | Initial RMS Error | RMS Error After 1$^{st}$ Iteration | RMS Error After 2$^{nd}$ Iteration | RMS Error After 3$^{rd}$ Iteration |
|---|---|---|---|---|
| R1 | 210.1 | 105.9 | 24.8 | 13.3 |
| R2 | 82.3 | 25.0 | 7.5 | 3.3 |
| R3 | 772.2 | 115.9 | 57.9 | 25.8 |

In each cycle, the initial interfaces for the zero-offset inversion were obtained by time-to-depth scaling of the zero-offset picks using the updated interval velocity model obtained in that cycle. At the end of three iterative cycles, a j value of near unity was obtained as shown in Table 2.

TABLE 2

Iterative j Values for Horizons R1, R2 and R3

| Horizon | Initial j Value | j Value After 1$^{st}$ Iteration | j Value After 2$^{nd}$ Iteration | j Value After 3$^{rd}$ Iteration |
|---|---|---|---|---|
| R1 | 16.80 | 8.47 | 1.98 | 1.06 |
| R2 | 8.23 | 2.50 | 0.75 | 0.33 |
| R3 | 38.61 | 5.79 | 2.89 | 1.29 |

Figure 5D:
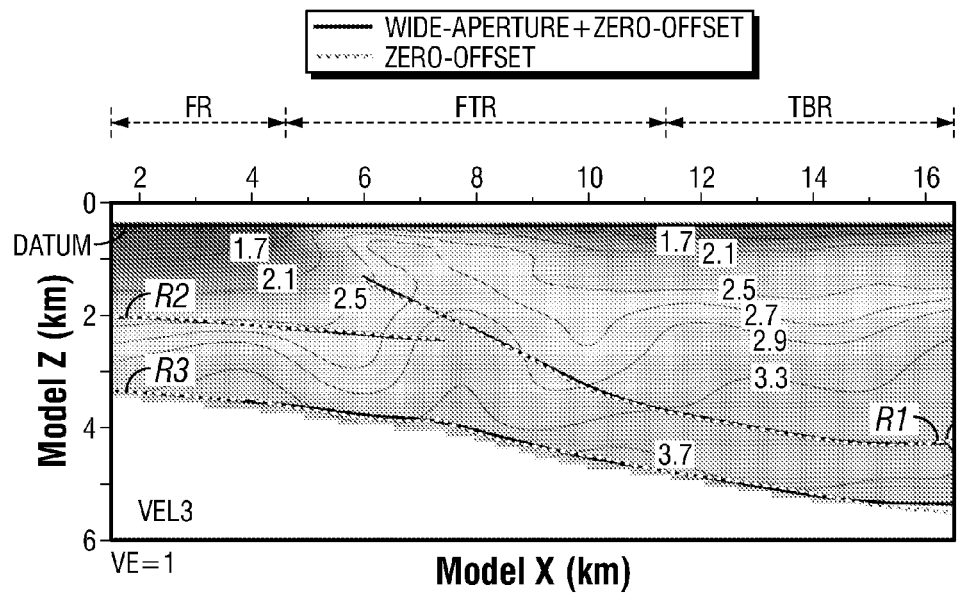
Figure 6B:
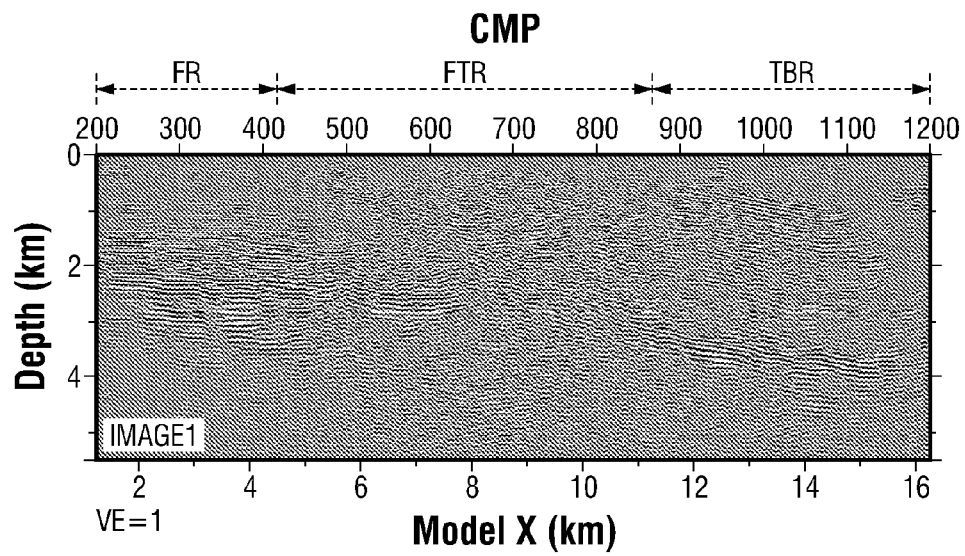
Figure 6C:
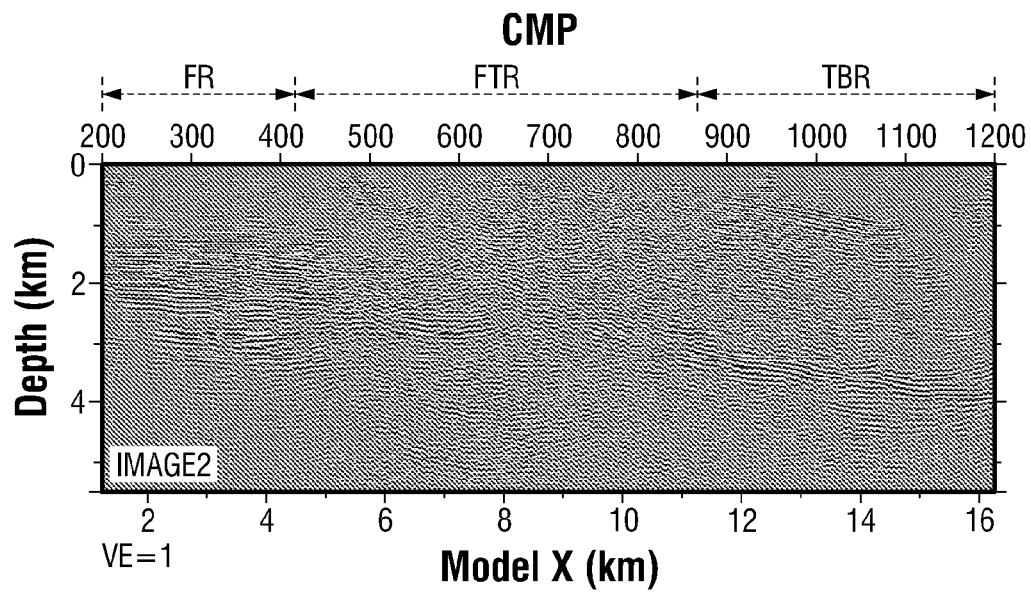
Figure 6D:
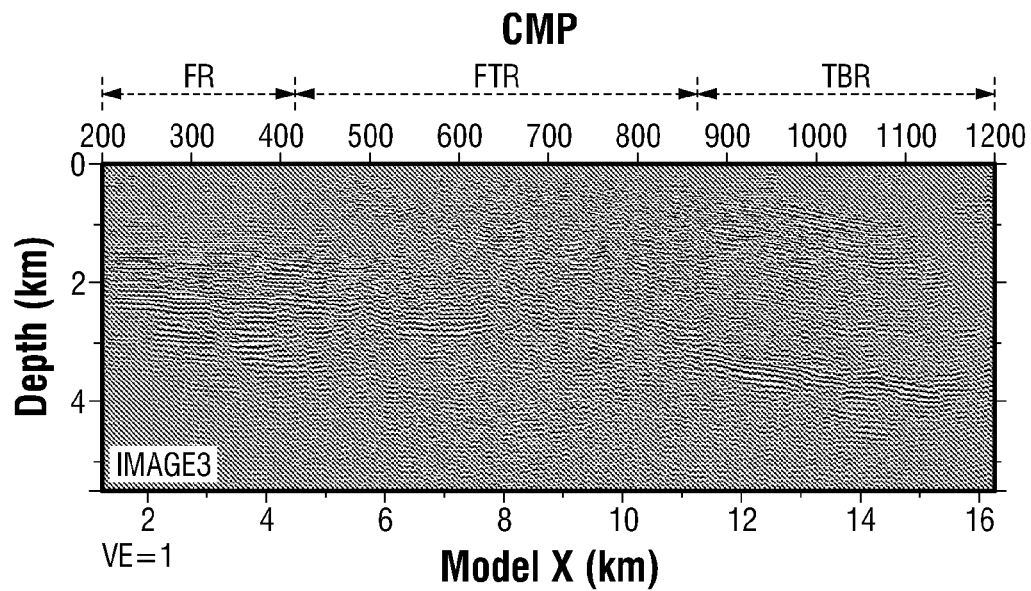
Figure 7B:
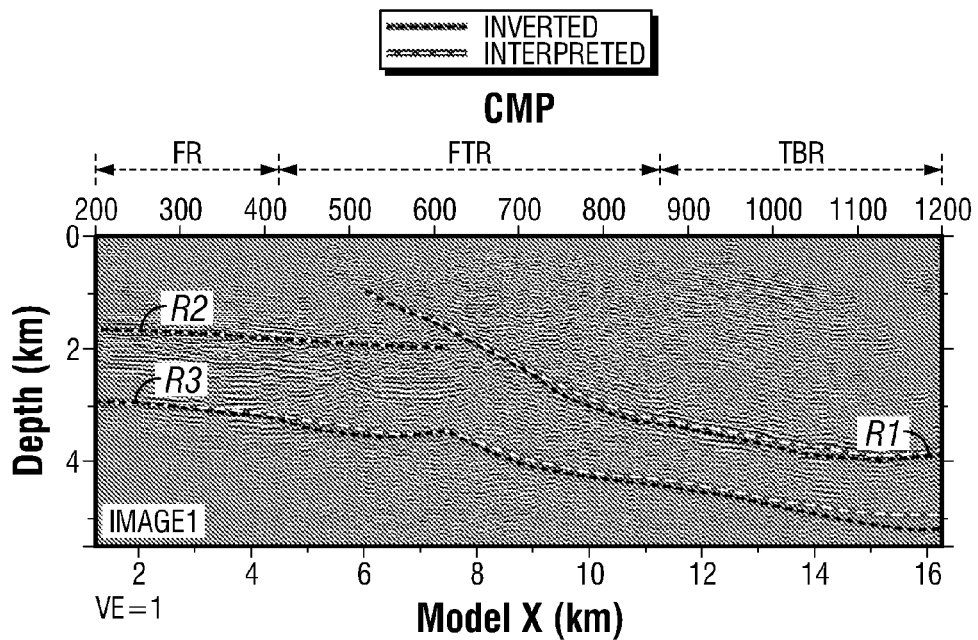
Figure 7C:
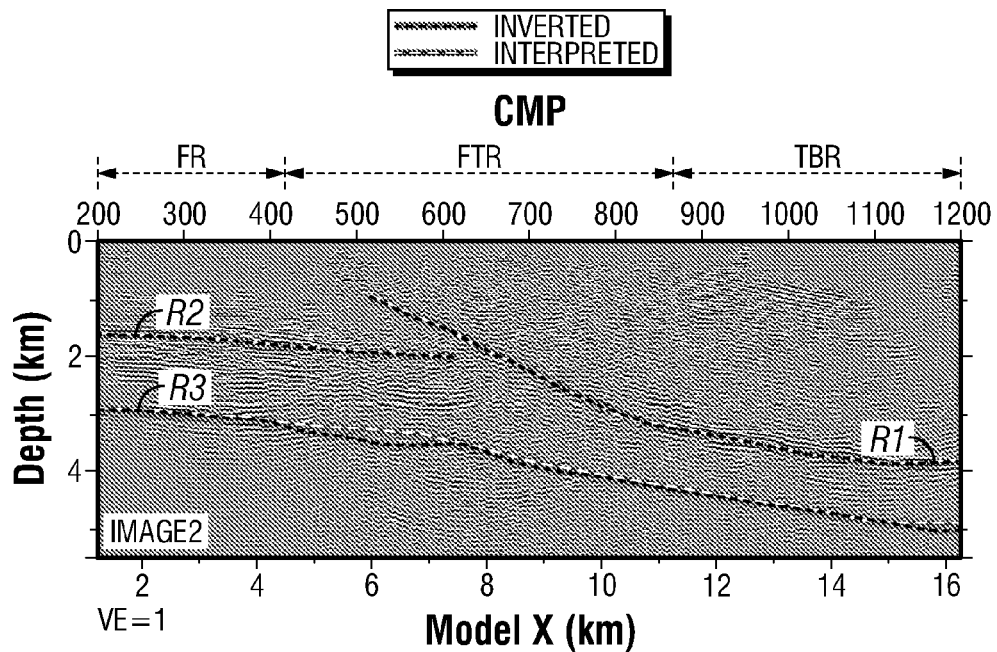
Figure 7D:
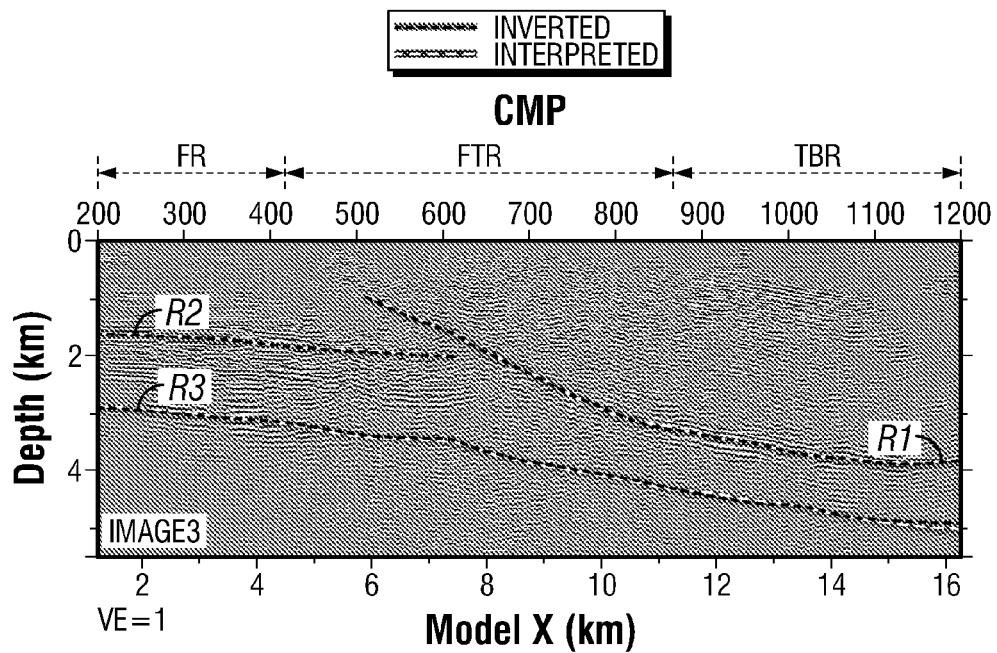

Due to lessening of the RMS errors and convergence of the j values, iterative processing was halted, yielding the final interval velocity model shown in FIG. 5D and the final depth image shown in FIG. 6D. As the interval velocity model and depth image evolved through iterative processing, data misfit was reduced, indicating that the derived interval velocity model and depth image were reasonable. Table 3 shows how data misfitting improved after each iterative cycle.

TABLE 3

| Horizon | Iteration | Predicted/Observed Traveltimes | RMS Traveltime Residual (ms) | $\chi^2$ Error |
|---|---|---|---|---|
| R1 | Initial | 2700/2700 | 58.58 | 8.58 |
|  | First | 2700/2700 | 27.41 | 1.87 |
|  | Second | 2589/2700 | 19.03 | 0.90 |
|  | Third | 2505/2700 | 20.15 | 1.01 |
| R2 | Initial | 1915/1973 | 36.78 | 5.96 |
|  | First | 1913/1973 | 25.78 | 2.97 |
|  | Second | 1909/1973 | 16.46 | 1.19 |
|  | Third | 1973/1973 | 14.15 | 0.89 |
| R3 | Initial | 4618/4708 | 194.60 | 60.69 |
|  | First | 4583/4708 | 94.97 | 14.39 |
|  | Second | 4403/4708 | 27.92 | 1.24 |
|  | Third | 4575/4708 | 23.98 | 0.91 |

Figure 8:
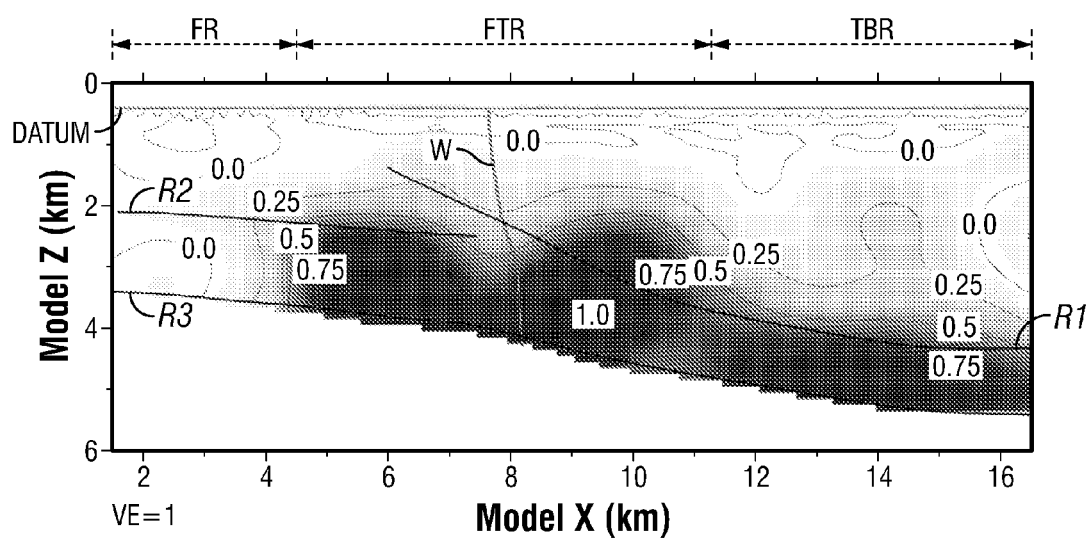
FIG. 8 shows the variance between each iteration of the illustrative interval velocity model generated by the methods disclosed herein.

Without being bound by theory or mechanism, it is believed that ongoing data misfitting may be attributed to residual static in the data and anisotropy that has not been accounted for in the traveltime inversion and the PSDM. In the end, values of 5000 for $\lambda$, 0.2 for $s_z$ and 0.5 for $\beta$ were found to be optimal for the joint inversion in the three iterative processing cycles. These values were determined by trial and error. The reduction in misfitting between the interpreted and inverted horizons appeared to progress from shallow to deep parts of the model, most likely because ray coverage is roughly inversely proportional to depth. FIG. 8 shows the variance between each iteration of the interval velocity model throughout the three iterations. As shown in FIG. 8, the iterative model updates occur predominantly in the deeper (greater than about 2 km) portion of the subsurface.

Figure 9B:
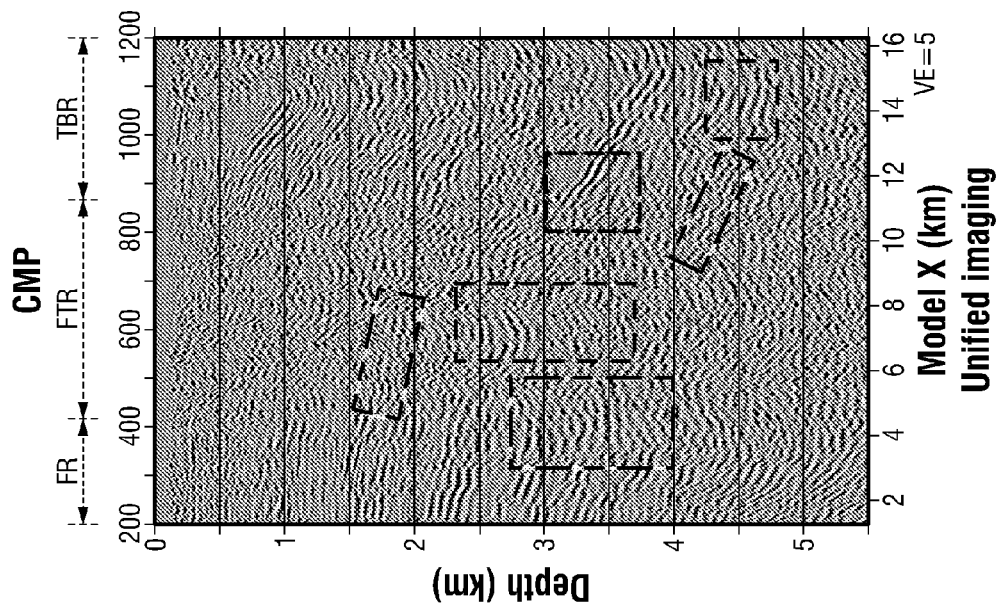
FIGS. 9A and 9B present illustrative vertically-exaggerated depictions of the initial depth image (FIG. 9A) and final depth image (FIG. 9B) generated by the methods disclosed herein.
Figure 9A:
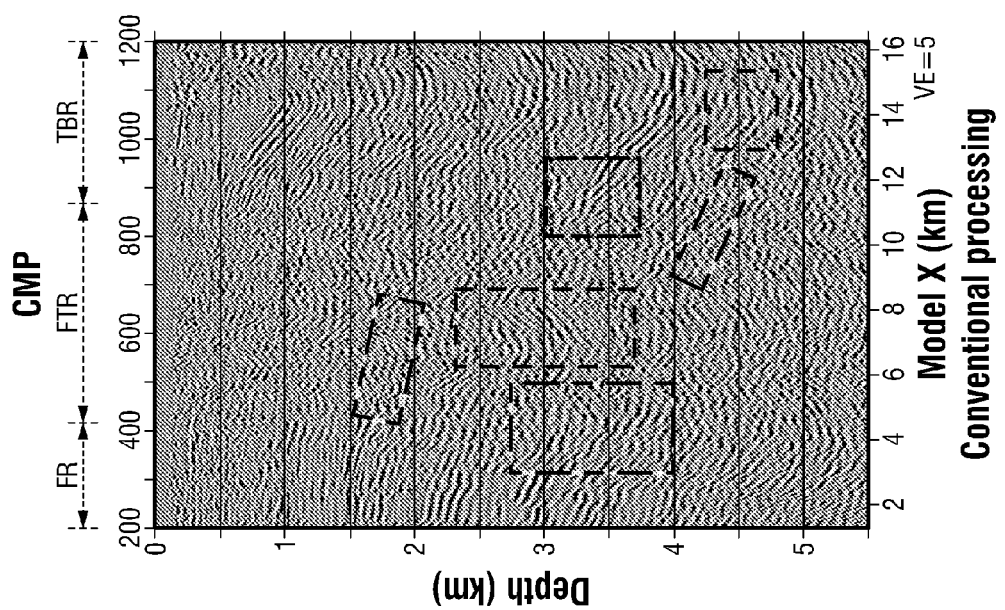

For an appreciation of the improvements to the depth images obtained by PSDM using the iteratively improved interval velocity models, FIGS. 9A and 9B respectively present vertically-exaggerated depictions of the initial and final depth images. Foremost, FIGS. 9A and 9B show that the overall S/N improved from the initial to final depth image. The changes were most prominent in regions where the velocity model updates were most significant (>1.5-km depth and particularly in the FTR). For example, reflections in the final depth image appeared to be more coherent than in the initial depth image between CMPs 250 and 450 and depths of 2-4 km. Reflections between CMPs 500 and 700 and 2.25-3.25 km depth and between CMPs 1000 and 1150 and 4.25-4.75 km depth were also better imaged in the final depth image. The improvement most likely represents the subthrust footwall stratigraphy. Furthermore, compared with the initial depth image, the southeast-dipping reflectors between CMPs 800 and 1000 and 3-3.75 km depth were better identified in the final depth image. This effect most likely represents a hanging wall.

Figure 10:
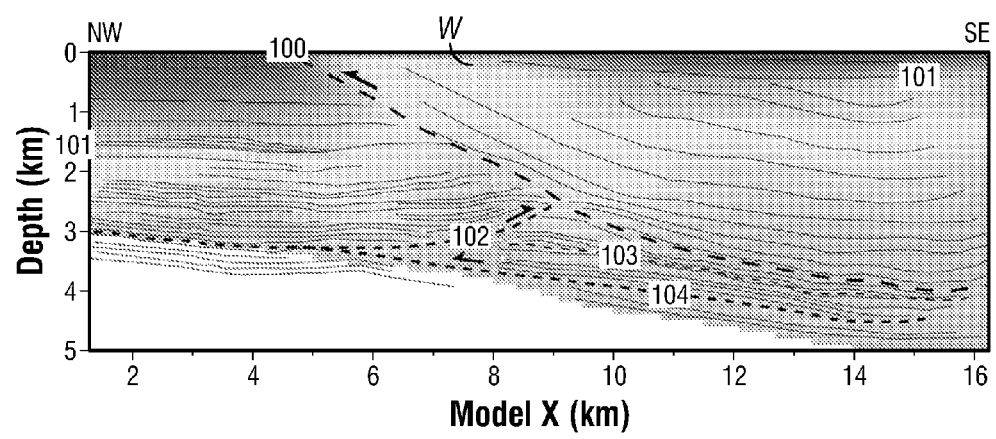
FIG. 10 presents an illustrative composite image of the finalized interval velocity model and the finalized depth image generated by the methods disclosed herein.

Interpretation of the Model: The NTFB geology was interpreted using a composite of the finalized interval velocity model and the finalized depth image, which is shown in FIG. 10. In FIG. 10, the reflectors of the finalized depth image are traced within the region of ray coverage and then superimposed on the finalized interval velocity model. The resulting composite image provides an overall structural and stratigraphic view of the subsurface geology.

Based on reflector geometry and associated velocity structure in FIG. 10, the main structural and stratigraphic features of the NTB were interpreted. The Naga thrust fault 100 was interpreted as 5-9 km model distance based on the steeply dipping reflectors, 9-11 km model distance based on reflector truncations, and 11-16 km model distance along the last truncated reflector maintaining a constant thickness. Hence, it closely follows the R1 horizon. Another unconformity 101 at approximately 1.5 km depth in the foreland extending into the subthrust was identified based on reflector onlaps. The same unconformity was interpreted in the suprathrust at 9-15 km model distance, based on reflector truncations.

The reflectors below the unconformity within 5 km model distance essentially had the same geometry as the unconformity itself. At 5 km model distance, the reflectors at 3 km depth appeared to diverge in their dips. This unconformity was interpreted as indicating the presence of another thrust fault 102 at this location that soles into the foreland stratigraphy within 0-5 km model distance, which underlies the northwest-dipping stratigraphy in the subthrust. The sense of vergence of thrust fault 102 was opposite to the Naga thrust fault, in general, and thrust fault 102 is interpreted as being a back-thrust fault to the Naga thrust. The stratigraphy below the Naga thrust fault seemed to be expanding toward the back-thrust fault. Floor thrusts 103 and 104 also were interpreted as being at the base of a wedge-shaped stratigraphy. The structural features described hereinabove together constitute a triangle zone. Such triangle zones are a fairly common petroleum exploration targets in the foothills of the Canadian Cordillera.

From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is the following:

1. A method for processing seismic data to produce a velocity model and a depth image, said method comprising:
    a) acquiring the seismic data;
    b) generating a shallow velocity model from the seismic data;
    c) generating a stacking velocity model using the shallow velocity model as a guide;
    d) generating an initial interval velocity model from the stacking velocity model;
    e) generating an initial depth image using the initial interval velocity model;
    f) identifying at least one depth image horizon in the initial depth image to determine initial interpreted interfaces, wherein said depth image horizon correspond to stack data horizons identified in stack data;
    g) calculating initial inverted interfaces with a computer using the initial interval velocity model, wherein the initial inverted interfaces are inverted stack data horizons; and
    h) performing a first congruency test on the initial interpreted interfaces and the initial inverted interfaces to determine a final depth image and a final velocity model for generating a geologic image that is displayed on a display.

2. The method of claim 1, wherein if a coefficient of congruence from the first congruency test is not in a predetermined range, the method further comprises:
    i) generating a first improved interval velocity model by traveltime inversion using the initial interpreted interfaces; and
    j) generating a first improved depth image by depth migration using the first improved interval velocity model.

3. The method of claim 2, further comprising:
    k) identifying first improved interpreted interfaces in the first improved depth image;
    l) calculating first improved inverted interfaces using the first improved interval velocity model;
    m) performing a second congruency test on the first improved interpreted interfaces and the first improved inverted interfaces to determine the final depth image and the final velocity model; and
    wherein if a coefficient of congruence from the second congruency test is not in a predetermined range,
    n) iterating steps i) through m);
    wherein iterating comprises:
        1) substituting the initial interpreted interfaces in step i) with the first improved interpreted interfaces to generate a second improved interval velocity model;
        2) substituting the first improved interval velocity model in step j) with the second improved interval velocity model to generate a second improved depth image;
        3) substituting the first improved depth image in step k) with the second improved depth image to identify second improved interpreted interfaces;
        4) substituting the first improved interval velocity model in step l) with the second improved interval velocity model to calculate second improved inverted interfaces; and
        5) substituting the first improved interpreted interfaces in step m) with the second improved interpreted interfaces and the first improved inverted interfaces in step m) with the second improved inverted interfaces and performing a third congruency test.

4. The method of claim 3, wherein the iterating is continued until the second improved interpreted interfaces and the second improved inverted interfaces have converged to a level of interpretational uncertainties present in the second improved depth image.

5. The method of claim 3, wherein each of the congruency tests comprise evaluating the coefficient of congruence, j.

6. The method of claim 3, further comprising generating a datum-corrected shallow velocity model from the shallow velocity model.

7. The method of claim 3, further comprising performing a stacking analysis of the seismic data prior to generating the stacking velocity model.

8. The method of claim 3, further comprising processing the seismic data to improve signal-to-noise.

9. The method of claim 8, further comprising performing a stacking analysis of the seismic data after the processing step.

10. The method of claim 3, wherein each of shallow velocity model, the initial interval velocity model, the first improved interval velocity model and the second improved interval velocity model are generated through traveltime inversion.

11. The method of claim 10, wherein the seismic data comprises reflection arrival times; and
wherein the traveltime inversion comprises inversion of the reflection arrival times.

12. The method of claim 3, wherein each of the initial depth image, the first improved depth image and the second improved depth image are generated through prestack depth migration.

13. The method of claim 1, wherein processing the seismic data is conducted in two dimensions.

14. The method of claim 1, wherein processing the seismic data is conducted in three dimensions.

15. A method for processing seismic data to concurrently produce a velocity model and a depth image, said method comprising:
  a) acquiring the seismic data;
  b) generating a shallow velocity model from the seismic data;
  c) stacking the seismic data;
  d) generating a stacking velocity model using the shallow velocity model as a guide;
  e) generating an initial interval velocity model from the stacking velocity model;
  f) generating an initial depth-migrated image using the initial interval velocity model;
  g) identifying at least one depth image horizon in the initial depth-migrated image to determine initial interpreted interfaces, wherein said depth image horizon correspond to stack data horizons identified in stack data;
  h) calculating initial inverted interfaces with a computer using the initial interval velocity model, wherein the initial inverted interfaces are inverted stack data horizons; and
  i) performing a first congruency test on the initial interpreted interfaces and the initial inverted interfaces to determine a final depth-migrated image and a final velocity model for generating a geologic image.

16. The method of claim 15, wherein if a coefficient of congruence from the first congruency test is not in a predetermined range, the method further comprising:
  j) generating a first improved interval velocity model by traveltime inversion using the initial interpreted interfaces;
  k) generating a first improved depth-migrated image by depth migration using the first improved interval velocity model;
  l) identifying first improved interpreted interfaces in the first improved depth-migrated image; and
  m) calculating first improved inverted interfaces using the first improved interval velocity model.

17. The method of claim 16, further comprising:
  n) performing a second congruency test on the first improved inverted interfaces and the first improved interpreted interfaces to determine the final depth-migrated image and the final velocity model;
    wherein if a coefficient of congruence from the second congruency test is not in a predetermined range,
  o) generating a second improved interval velocity model using the first improved interpreted interfaces;
  p) generating a second improved depth-migrated image using the second improved interval velocity model; and
  q) iterating steps m) through q);
    wherein iterating comprises:
      1) substituting the first improved depth-migrated image in step l) with the second improved depth-migrated image to identify second improved interpreted interfaces;
      2) substituting the first improved interval velocity model in step m) with the second improved interval velocity model to calculate second improved inverted interfaces;
      3) substituting the first improved inverted interfaces in step n) with the second improved inverted interfaces;
      4) substituting the first improved interpreted interfaces in step n) with the second improved interpreted interfaces; and
      5) performing a third congruency test on the second improved inverted interfaces and the second improved interpreted interfaces in step o);
        wherein iterating is continued until the second improved interpreted interfaces and the second improved inverted interfaces have converged to a level of interpretational uncertainties present in the second improved depth-migrated image.

18. The method of claim 17, further comprising:
processing the seismic data before generating the stacking velocity model;
  wherein processing comprises improving signal-to-noise in the seismic data.

19. The method of claim 17, wherein step f) comprises using pre-stack depth migration for generating an initial depth-migrated image.

20. A method for processing seismic data to concurrently produce a velocity model and a depth image, said method comprising:
  a) acquiring the seismic data;
  b) processing the seismic data to produce processed seismic data;
    wherein the processing step comprises improving signal-to-noise in the seismic data;
  c) generating a shallow velocity model from the processed seismic data;
  d) making static corrections to the processed seismic data using the shallow velocity model as a guide to produce static-corrected seismic data;
  e) generating a datum-corrected shallow velocity model from the static-corrected seismic data;
  f) generating a stacking velocity model using the datum-corrected shallow velocity model as a guide;
  g) stacking the static-corrected seismic data;
  h) generating an initial interval velocity model from the stacking velocity model;
  i) generating an initial depth-migrated image using the initial interval velocity model through prestack depth migration;
  j) identifying at least one depth image horizon in the initial depth-migrated image to determine initial interpreted interfaces, wherein said depth image horizon correspond to stack data horizons identified in stack data;
  k) calculating initial inverted interfaces with a computer using the initial interval velocity model, wherein the initial inverted interfaces are inverted stack data horizons;

l) performing a first congruency test on the initial interpreted interfaces and the initial inverted interfaces to determine a final depth-migrated image and a final velocity model for generating a geologic image;

wherein if a coefficient of congruence from the first congruency test is not in a predetermined range, m) generating a first improved interval velocity model by depth migration using the initial interpreted interfaces;

n) generating a first improved depth-migrated image by traveltime inversion using the first improved interval velocity model;

o) identifying first improved interpreted interfaces in the first improved depth-migrated image;

p) calculating first improved inverted interfaces using the first improved interval velocity model;

q) performing a second congruency test on the first improved inverted interfaces and the first improved interpreted interfaces to determine the final depth-migrated image and the final velocity model; and r) iterating steps m) through q);

wherein iterating comprises:

1) substituting the initial interpreted interfaces in step m) with the first improved interpreted interfaces to generate a second improved interval velocity model;

2) substituting the first improved interval velocity model in step n) with the second improved interval velocity model to generate a second improved depth-migrated image;

3) substituting the first improved interval velocity model in step p) with the second improved interval velocity model to calculate second improved inverted interfaces;

4) substituting the first improved depth-migrated image in step o) with the second improved depth-migrated image to identify second improved interpreted interfaces;

5) substituting the first improved inverted interfaces in step q) with the second improved inverted interfaces;

6) substituting the first improved interpreted interfaces in step q) with the second improved interpreted interfaces; and 7) performing a third congruency test on the second improved inverted interfaces and the second improved interpreted interfaces in step q);

wherein iterating is continued until there is a convergence of the second improved inverted interfaces and the second improved interpreted interfaces to a level of interpretational uncertainties present in the second improved depth-migrated image.

* * * * *